(12) United States Patent
Stephanick et al.

(10) Patent No.: US 7,750,891 B2
(45) Date of Patent: Jul. 6, 2010

(54) SELECTIVE INPUT SYSTEM BASED ON TRACKING OF MOTION PARAMETERS OF AN INPUT DEVICE

(75) Inventors: James Stephanick, Seattle, WA (US); Christina James, Seattle, WA (US); Ethan R. Bradford, Seattle, WA (US); Michael R. Longé, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 1632 days.

(21) Appl. No.: 10/881,819

(22) Filed: Jun. 28, 2004

(65) Prior Publication Data

US 2005/0052406 A1 Mar. 10, 2005

Related U.S. Application Data

(63) Continuation-in-part of application No. 10/677,890, filed on Oct. 1, 2003, now Pat. No. 7,286,115.

(60) Provisional application No. 60/504,552, filed on Sep. 19, 2003, provisional application No. 60/461,735, filed on Apr. 9, 2003.

(51) Int. Cl.
*G06F 3/041* (2006.01)
*G06K 11/06* (2006.01)
*G08C 21/00* (2006.01)

(52) U.S. Cl. .................. 345/173; 178/18.01; 178/18.03

(58) Field of Classification Search ......... 345/173–179; 178/18.01–20.04; 341/5
See application file for complete search history.

(56) References Cited

U.S. PATENT DOCUMENTS 3,980,869 A 9/1976 Lombardino et al.

(Continued)

FOREIGN PATENT DOCUMENTS

CN 1116335 A 2/1996

(Continued)

OTHER PUBLICATIONS

John Arnott, "Probabilistic Character Disambiguation for Reduced Keyboards Using Small Text Samples," Sep. 1992, AAC Augmentative and Alternative Communication, vol. 8, No. 3, pp. 215-223.

(Continued)

*Primary Examiner*—Srilakshmi K Kumar
(74) *Attorney, Agent, or Firm*—Michael A. Glenn; Glenn Patent Group

(57) ABSTRACT

A selective input system and associated method is provided which tracks the motion of a pointing device over a region or area. The pointing device can be a touchpad, a mouse, a pen, or any device capable of providing two or three-dimensional location. The region or area is preferably augmented with a printed or actual keyboard/pad. Alternatively, a representation of the location of the pointing device over a virtual keyboard/pad can be dynamically shown on an associated display. The system identifies selections of items or characters by detecting parameters of motion of the pointing device, such as length of motion, a change in direction, a change in velocity, and or a lack of motion at locations that correspond to features on the keyboard/pad. The input system is preferably coupled to a text disambiguation system such as a T9® or Sloppytype™ system, to improve the accuracy and usability of the input system.

143 Claims, 13 Drawing Sheets

U.S. PATENT DOCUMENTS

| | | |
|---|---|---|
| 4,286,329 A | 8/1981 | Goertzel et al. |
| 4,365,235 A | 12/1982 | Greanias et al. |
| 4,439,649 A | 3/1984 | Cecchi |
| 4,454,592 A | 6/1984 | Cason et al. |
| 4,559,598 A | 12/1985 | Goldwasser et al. |
| 4,561,105 A | 12/1985 | Crane et al. |
| 4,573,196 A | 2/1986 | Crane et al. |
| 4,689,768 A | 8/1987 | Heard et al. |
| 4,725,694 A | 2/1988 | Auer et al. |
| 4,782,464 A | 11/1988 | Gray et al. |
| 4,783,758 A | 11/1988 | Kucera |
| 4,783,761 A | 11/1988 | Gray et al. |
| 4,891,777 A | 1/1990 | Lapeyre |
| 4,891,786 A | 1/1990 | Goldwasser |
| 5,109,352 A | 4/1992 | O'Dell |
| 5,127,055 A | 6/1992 | Larkey |
| 5,187,480 A | 2/1993 | Thomas et al. |
| 5,224,179 A | 6/1993 | Denker et al. |
| 5,305,205 A | 4/1994 | Weber et al. |
| 5,317,507 A | 5/1994 | Gallant |
| 5,457,454 A | 10/1995 | Sugano |
| 5,462,711 A | 10/1995 | Ricottone |
| 5,533,147 A | 7/1996 | Arai et al. |
| 5,561,446 A | 10/1996 | Montlick |
| 5,574,482 A | 11/1996 | Niemeier |
| 5,583,946 A | 12/1996 | Gourdol |
| 5,586,198 A | 12/1996 | Lakritz |
| 5,612,690 A | 3/1997 | Levy |
| 5,649,223 A | 7/1997 | Freeman |
| 5,664,896 A | 9/1997 | Blumberg |
| 5,734,750 A | 3/1998 | Arai et al. |
| 5,745,719 A | 4/1998 | Falcon |
| 5,748,512 A | 5/1998 | Vargas |
| 5,754,686 A | 5/1998 | Harada et al. |
| 5,784,008 A | 7/1998 | Raguseo |
| 5,796,867 A | 8/1998 | Chen et al. |
| 5,798,760 A | 8/1998 | Vayda et al. |
| 5,805,911 A | 9/1998 | Miller |
| 5,812,696 A | 9/1998 | Arai et al. |
| 5,812,697 A | 9/1998 | Sakai et al. |
| 5,818,437 A | 10/1998 | Grover et al. |
| 5,870,492 A | 2/1999 | Shimizu et al. |
| 5,896,321 A | 4/1999 | Miller et al. |
| 5,917,476 A | 6/1999 | Czerniecki |
| 5,923,793 A | 7/1999 | Ikebata |
| 5,926,566 A | 7/1999 | Wang et al. |
| 5,928,588 A | 7/1999 | Chen et al. |
| 5,933,526 A | 8/1999 | Sklarew |
| 5,952,942 A | 9/1999 | Balakrishnan et al. |
| 5,953,541 A | 9/1999 | King et al. |
| 5,956,021 A | 9/1999 | Kubota et al. |
| 5,963,671 A | 10/1999 | Comerford et al. |
| 5,973,676 A | 10/1999 | Kawakura |
| 6,002,390 A | 12/1999 | Masui |
| 6,002,799 A | 12/1999 | Sklarew |
| 6,009,444 A | 12/1999 | Chen |
| 6,011,554 A | 1/2000 | King et al. |
| 6,028,959 A | 2/2000 | Wang et al. |
| 6,041,137 A | 3/2000 | Van Kleeck |
| 6,044,165 A | 3/2000 | Perona et al. |
| 6,054,941 A | 4/2000 | Chen |
| 6,075,469 A | 6/2000 | Pong |
| 6,094,197 A | 7/2000 | Buxton et al. |
| 6,104,317 A | 8/2000 | Panagrossi |
| 6,104,384 A | 8/2000 | Moon et al. |
| 6,130,962 A | 10/2000 | Sakurai |
| 6,144,764 A | 11/2000 | Yamakawa et al. |
| 6,148,104 A | 11/2000 | Wang et al. |
| 6,157,379 A | 12/2000 | Singh |
| 6,169,538 B1 | 1/2001 | Nowlan et al. |
| 6,172,625 B1 | 1/2001 | Jin et al. |
| 6,204,848 B1 | 3/2001 | Nowlan et al. |
| 6,212,297 B1 | 4/2001 | Sklarew |
| 6,275,611 B1 | 8/2001 | Parthasarathy |
| 6,278,445 B1 | 8/2001 | Tanaka et al. |
| 6,286,064 B1 | 9/2001 | King et al. |
| 6,307,549 B1 | 10/2001 | King et al. |
| 6,314,418 B1 | 11/2001 | Namba |
| 6,320,943 B1 | 11/2001 | Borland |
| 6,362,752 B1 | 3/2002 | Guo et al. |
| 6,392,640 B1 | 5/2002 | Will |
| 6,424,743 B1 | 7/2002 | Ebrahimi |
| 6,437,709 B1 | 8/2002 | Hao |
| 6,448,987 B1 | 9/2002 | Easty et al. |
| 6,453,079 B1 | 9/2002 | McInerny |
| 6,489,951 B1 * | 12/2002 | Wong et al. .................. 345/173 |
| 6,493,464 B1 | 12/2002 | Hawkins et al. |
| 6,502,118 B1 | 12/2002 | Chatterjee |
| 6,542,170 B1 | 4/2003 | Williams et al. |
| 6,549,219 B2 | 4/2003 | Selker |
| 6,567,072 B2 | 5/2003 | Watanabe |
| 6,585,162 B2 | 7/2003 | Sandbach et al. |
| 6,616,703 B1 | 9/2003 | Nakagawa |
| 6,654,733 B1 | 11/2003 | Goodman et al. |
| 6,686,852 B1 | 2/2004 | Guo |
| 6,686,907 B2 | 2/2004 | Su et al. |
| 6,711,290 B2 | 3/2004 | Sparr et al. |
| 6,757,544 B2 | 6/2004 | Rangarajan et al. |
| 6,765,554 B2 | 7/2004 | Millington |
| 6,801,659 B1 | 10/2004 | O'Dell |
| 6,807,529 B2 | 10/2004 | Johnson et al. |
| 6,819,315 B2 | 11/2004 | Toepke et al. |
| 6,820,075 B2 | 11/2004 | Shanahan et al. |
| 6,829,607 B1 | 12/2004 | Tafoya et al. |
| 6,864,809 B2 | 3/2005 | O'Dell et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,970,599 B2 | 11/2005 | Longe et al. |
| 6,973,332 B2 | 12/2005 | Mirkin et al. |
| 6,982,658 B2 | 1/2006 | Guo |
| 6,990,534 B2 * | 1/2006 | Mikhailov et al. .......... 709/250 |
| 7,020,270 B1 | 3/2006 | Ghassabian |
| 7,020,849 B1 | 3/2006 | Chen |
| 7,057,607 B2 | 6/2006 | Mayoraz et al. |
| 7,075,520 B2 | 7/2006 | Williams |
| 7,088,861 B2 | 8/2006 | Van Meurs |
| 7,095,403 B2 | 8/2006 | Lyustin et al. |
| 7,107,204 B1 | 9/2006 | Liu et al. |
| 7,139,430 B2 | 11/2006 | Sparr et al. |
| 7,149,550 B2 | 12/2006 | Kraft et al. |
| 7,151,533 B2 | 12/2006 | Van Ieperen |
| 7,155,683 B1 | 12/2006 | Williams |
| 7,224,989 B2 | 5/2007 | Kraft |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Hotsberg |
| 7,385,531 B2 | 6/2008 | Zhang |
| 7,389,235 B2 | 6/2008 | Dvorak |
| 7,437,001 B2 | 10/2008 | Morwing et al. |
| 7,466,859 B2 | 12/2008 | Chang et al. |
| 2001/0048425 A1 | 12/2001 | Partridge |
| 2002/0013556 A1 | 1/2002 | Cote, Sr. et al. |
| 2002/0093491 A1 | 7/2002 | Gillespie et al. |
| 2002/0122072 A1 | 9/2002 | Selker |
| 2002/0135499 A1 | 9/2002 | Guo |
| 2002/0135561 A1 * | 9/2002 | Rojewski .................... 345/156 |
| 2002/0145587 A1 | 10/2002 | Watanabe |
| 2002/0163544 A1 | 11/2002 | Baker et al. |
| 2002/0168107 A1 | 11/2002 | Tang et al. |
| 2003/0006956 A1 | 1/2003 | Wu et al. |

| | | | |
|---|---|---|---|
| 2003/0023426 A1 | 1/2003 | Pun et al. | |
| 2003/0048257 A1* | 3/2003 | Mattila | 345/169 |
| 2003/0054830 A1 | 3/2003 | Williams et al. | |
| 2003/0144830 A1 | 7/2003 | Williams | |
| 2003/0179930 A1 | 9/2003 | O'Dell et al. | |
| 2003/0184451 A1 | 10/2003 | Li | |
| 2004/0153963 A1 | 8/2004 | Simpson et al. | |
| 2004/0153975 A1 | 8/2004 | Williams et al. | |
| 2004/0163032 A1 | 8/2004 | Guo et al. | |
| 2004/0243389 A1 | 12/2004 | Thomas et al. | |
| 2005/0060138 A1 | 3/2005 | Wang et al. | |
| 2005/0114770 A1 | 5/2005 | Sacher et al. | |
| 2005/0223308 A1 | 10/2005 | Gunn et al. | |
| 2006/0062461 A1 | 3/2006 | Longe et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0190819 A1 | 8/2006 | Ostergaard et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2006/0247915 A1 | 11/2006 | Bradford et al. | |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | LaPointe et al. | |
| 2008/0130996 A1 | 6/2008 | Sternby | |

FOREIGN PATENT DOCUMENTS

| | | |
|---|---|---|
| CN | 1190205 A | 8/1998 |
| CN | 1232204 A | 10/1999 |
| CN | 1358299 A | 7/2002 |
| CN | 1606753 | 4/2005 |
| DE | 3401942 | 11/1984 |
| EP | 0114250 | 11/1983 |
| EP | 0739521 | 5/1996 |
| EP | 0762265 | 3/1997 |
| EP | 0961208 | 12/1999 |
| EP | 1018679 | 12/1999 |
| EP | 1085401 | 3/2001 |
| EP | 1168780 | 1/2002 |
| EP | 1355225 | 10/2003 |
| FR | 2824979 | 11/2002 |
| JP | 57010832 | 1/1982 |
| JP | 62065136 | 3/1987 |
| JP | 1023021 | 1/1989 |
| JP | 1047565 | 2/1989 |
| JP | 1993-081482 | 4/1993 |
| JP | 1994-083816 | 3/1994 |
| JP | 7094376 | 4/1995 |
| JP | 1995-146918 | 6/1995 |
| JP | 1996-305701 | 11/1996 |
| JP | 8319721 | 12/1996 |
| JP | 10135399 | 5/1998 |
| JP | 10-275046 | 10/1998 |
| JP | 11021274 | 1/1999 |
| JP | 11028406 | 2/1999 |
| JP | 1999-338858 | 12/1999 |
| JP | 2001-043205 | 2/2001 |
| JP | 2001-282778 | 10/2001 |
| JP | A 2003-500771 | 1/2003 |
| KR | 2001-0107388 | 12/2001 |
| KR | 20020004419 | 1/2002 |
| TW | 498264 B | 8/2002 |
| WO | WO 98/16889 | 4/1998 |
| WO | WO 99/15952 | 4/1999 |
| WO | WO 00/72300 | 11/2000 |
| WO | WO 0074240 | 12/2000 |
| WO | WO 03/021788 | 3/2003 |
| WO | WO 2004/111812 | 12/2004 |
| WO | WO 2004/111871 | 12/2004 |
| WO | WO 2006/026908 | 3/2006 |

OTHER PUBLICATIONS

Amin, A., et al., "Recognition of Hand-printed Chinese Characters Using Decision Trees/Machine Learning of C4.5 System," 1998, Pattern Analysis and Applications, pp. 130-141, vol. 1, Issue 2.

Chen, Ju-Wei, et al., "A Hierarchical Representation for the Reference Database of On-Line Chinese Character Recognition," Aug. 20-23, 1996, INSPEC Abstract No. C9702-1250B-021.

Cheng, Rei-Heng, et al., "Recognition of Radicals in Handwritten Chinese Characters by Means of Problem Reduction and Knowledge Guidance," Sep. 1996, International Journal of Pattern Recognition and Artificial Intelligence, INSPEC Abstract No. C9706-5260B-280.

Chou, Kuo-Sen, et al., "Radical-Based Neighboring Segment Matching for On-Line Chinese Character Recognition," Aug. 25-26, 1996, Proceedings of the 13$^{th}$ International Conference on Pattern Recognition; INSPEC Abstract No. B9701-6140C-682, C9701-1250B-019.

Chou, Kuo-Sen, et al., "Radical-Based Neighboring Segment Matching for On-Line Chinese Character Recognition"; Apr. 1997, Computer Processing of Oriental Languages, INSPEC Abstract No. B9701-6140C-682, C9701-1250B-019.

Connell, S., et al., "Template-based Online Character Recognition"; Aug. 10, 1999; Department of Computer Science and Engineering, Michigan State University, East Lansing, Michigan.

Fan, Fang, et al., "An On-Line Handwritten Chinese Character Recognition System", Jan. 26-27, 2000, Proceedings of the SPIE—The International Society for Optical Engineering, INSPEC Abstract No. C2000-12-5260B-085.

Hung, Kwok-Wah, et al., "Boxing Code for Stroke-Order Free Handprinted Chinese Characters Recognition"; Oct. 8-11, 2000, Proceedings of IEEE International Conference on Systems, Man, Cybernetics, INSPEC Abstract No. C2001-01-5260B-087.

Kim, Ki-Cheol, et al., "On-Line Recognition of Stroke-Order Free Cursive Chinese Characters with Relaxation Matching", Mar. 1995; Journal of the Korea Information Science Society, INSPEC Abstract No. C9507-1250B-022.

Li, Xiaolin, et al., "On-Line Handwritten Alphanumeric Character Recognition Using Feature Sequences", 1995; Department of Computer Science, Hong Kong University of Science and Technology, Clear Water Bay, Kowloon, Hong Kong.

Lin, Chang-Keng, et al., "Stroke-Order Independent On-Line of Handwritten Chinese Characters"; Nov. 8-10, 1989, Proceedings of the SPIE—The International Society for Optical Engineering, INSPEC Abstract No. C90031813.

Liu, J.Z., et al., "Two-layer Assignment Method for Online Chinese Character Recognition", Feb. 2000, IEEE Proceedings-Vision, Image and Signal Processing, INSPEC Abstract No. C2000-06-1250B-004.

Liu, Jianzhuang, et al., "Stroke Order and Stroke Number Free On-Line Chinese Character Recognition Using Attributed Relational Graph Matching", Aug. 25-29, 1996 Proceedings of the 13$^{th}$ International Conference on Pattern Recognition, INSPEC Abstract No. C9701-1250B-035.

Naito, S., et al., "Rough Classification for Handprinted Chinese Characters by Stroke Density"; Aug. 1981; Transactions of the Institute of Electronics and Communication Engineers of Japan, INSPEC Abstract No. C82009693.

Nambu, H., et al., "On-Line Chinese Handwriting Character Recognition: Comparison with Japanese Kanji Recognition and Improvement of Input Efficiency", Aug. 1999; Transactions of the Information Processing Society of Japan, INSPEC Abstract No. B2000-01-6135E-035, C2000-01-5260B-099.

Odaka, K., et al., "Stroke Order Free On-Line Handwritten Character Recognition of Algorithm", Jun. 1982, Transactions of the Institute of Electronics and Communication Engineers of Japan, Section E, INSPEC Abstract No. C82041007.

Pan, Bao-Chang, et al., "Recognition of Handprinted Chinese Characters by Stroke Order Codes", Aug. 29-Sep. 1, 1988, International Conference on Computer Processing of Chinese and Oriental Languages, INSPEC Abstract No. C89024386.

Park, Hee-Seon, et al., "An On-line Recognition System for Cursive Chinese Characters with Effective Coarse Classification and Elastic Matching", Sep. 1993, Journal of the Korea Information Science Society, INSPEC Abstract No. C9404-1250B-001.

Romero, R., et al., "Optical Chinese Character Recognition using Probabilistic Neural Networks", Jul. 1996; Imaging Systems Lab, Robotics Institute, Carnegie Mellon University, Pittsburgh, PA, pp. 1-18.

Seni, G., et al., "Large Vocabulary Recognition of On-Line Handwritten Cursive Words", Jun. 1996; presented at IEEE Transaction on Pattern Analysis and Machine Intelligence.

Shin, J., "Online Handwriting Character Analysis Using Stroke Correspondence Search," Sep. 2001, Journal of Shanghai University, Aizu University, Fukushima, Japan, INSPEC Abstract No. C2001-11-1250B-012.

Srihari, S., et al., "Cherry Blossom: A System for Japanese Character Recognition," 1997; Center for Excellence for Document Analysis and Recognition, State University of New York at Buffalo, Buffalo, NY.

Stockton, R. et al., "JKanji: Wavelet-based Interactive Kanji Competition," Sep. 3-7, 2000, Proceedings of the 15$^{th}$ International Conference on Pattern Recognition.

"Quick Stroke Information," Synaptics, retrieved on Nov. 18, 2006 from website: www.synaptics.com/products/quickstroke_faq.cfm and www.synaptics.com/products/quickstroke.cfm.

Vuurpijl, L. et al., "Coarse Writing-Style Clustering Based on Simple Stroke-Related Features," 1997; Institute for Cognition and Information, University of Nijmegen, Nijmegen, The Netherlands.

Zheng, Jing, et al., "Recognizing On-Line Handwritten Chinese Character Via FARG Matching," Aug. 18-20, 1997, Proceedings of the Fourth International Conference on Document Analysis and Recognition, INSPEC Abstract No. B9711-6140C-162, C971-5260B-123.

Shumin Zhai and Per-Ola Kristensson, *Shorthand Writing on Stylus Keyboard*, Apr. 5-10, 2003, CHI 3003, 5(1): 97-104, 2003.

Jennifer Mankoff and Gregory D. Abowd, *Error Correction Techniques for Handwriting, Speech and other Ambiguous or Error Prone Systems*, submitted to Interact '99.

Jennifer Mankoff and Gregory D. Abowd, *Cirrin: A Word-Level Unistroke Keyboard for Pen Input*, Proceedings of UIST 1998, Technical note. pp. 213-214.

K. Perlin, *Quikwriting: Continuous Stylus-Based Text Entry*; presented at ACM UIST'98 Conference.

M. Garrett, D. Ward, I. Murray, P. Cowans, and D. Mackay, *Implementation of Dasher, an Information Efficient Input Mechanism*, presented at LINUX 2003 Conference, Edinburgh, Scotland.

P. Isokoski and R. Raisamo, *Device Independent Text Input: A Rationale and an Example*, Proceedings of the Working Conference on Advanced Visual Interfaces AVI2000, pp. 76-83, Palermo, Italy, 2000.

P. Isokoski, *Text Input Methods for Eye Trackers Using Off-Screen Targets*, In Proceedings of Eye Tracking Research & Applications Symposium 2000, pp. 15-21. ACM, 2000.

P. Isokoski, *Model for Unistroke Writing Time*, CHI Letters: Human Factors in Computing Systems, CHI 2001, 3(1):357-364, 2001.

P. Isokoski and M. Käki. *Comparison of Two Touchpad-Based Methods for Numeric Entry*, CHI Letters: Human Factors in Computing Systems, CHI 2002, 4(1): 25-32, 2002.

P. Isokoski and I. Scott MacKenzie, *Text Entry on Mobile Systems: Directions for the Future*, CHI 2001 Extended Abstracts, p. 495, 2001.

P. Isokoski and I. S. MacKenzie; *Report on the CHI2001 Workshop on Text Entry on Mobile Systems*, SIGCHI Bulletin, p. 14, Sep./Oct. 2001.

P. Isokoski and I. S. MacKenzie. *Combined Model for Text Entry Rate Development*, CHI2003 Extended Abstracts, pp. 752-753, 2003.

P. Isokoski and R. Raisamo, *Architecture for Personal Text Entry Methods*, In Closing the Gap: Software Engineering and Human-Computer Interaction, pp. 1-8. IFIP, 2003.

*Handbook for the Palm V™ Organizer*, Palm Computing, Inc., Santa, Clara, CA1998-1999.

Masui, T.; "An Efficient Text Input method for Pen-based Computers"; Apr. 1998; Proceedings of the ACM Conf. on Human Factors in Computing Systems (CHI'98), ACM Press, pp. 328-335.

\* cited by examiner

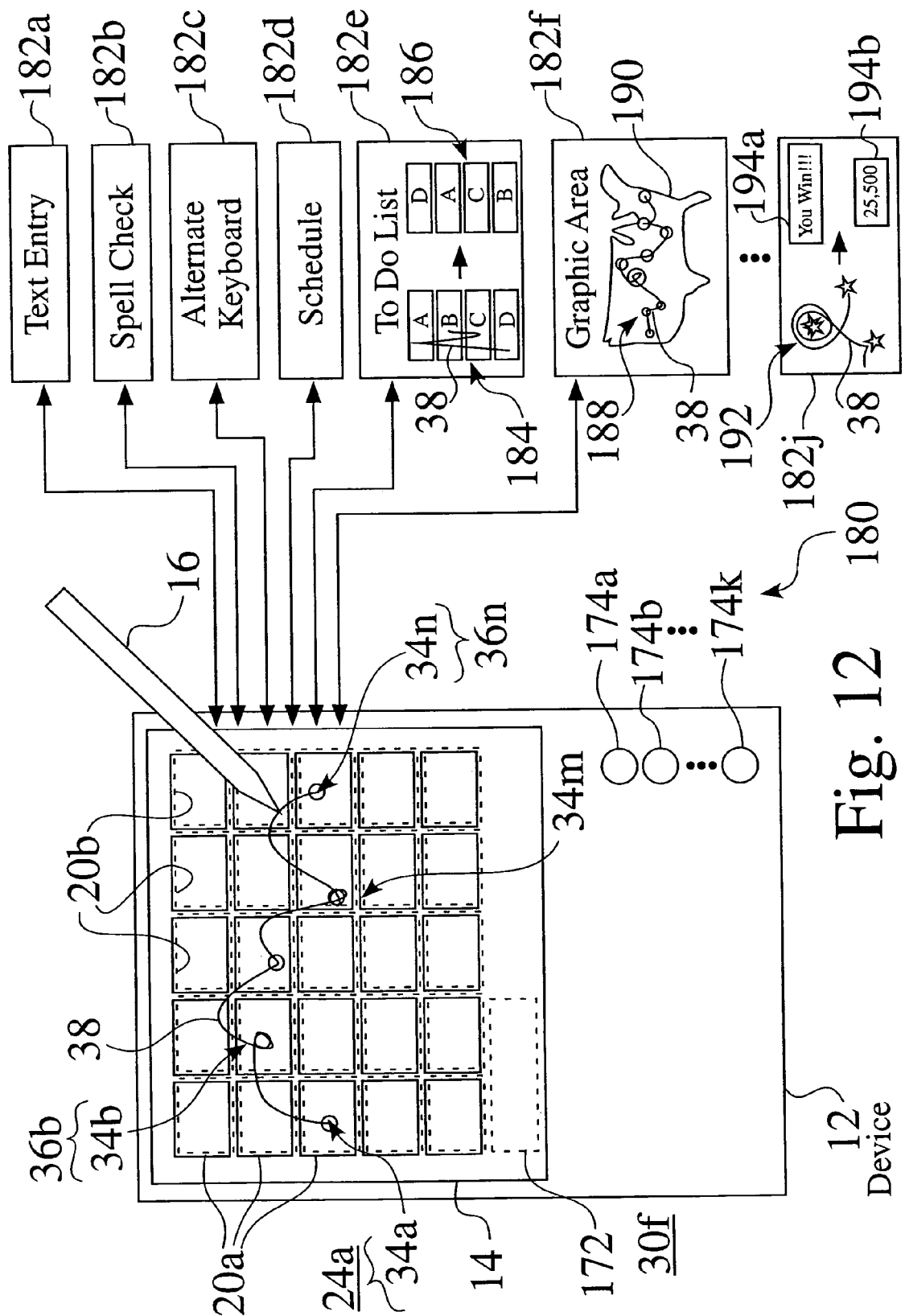

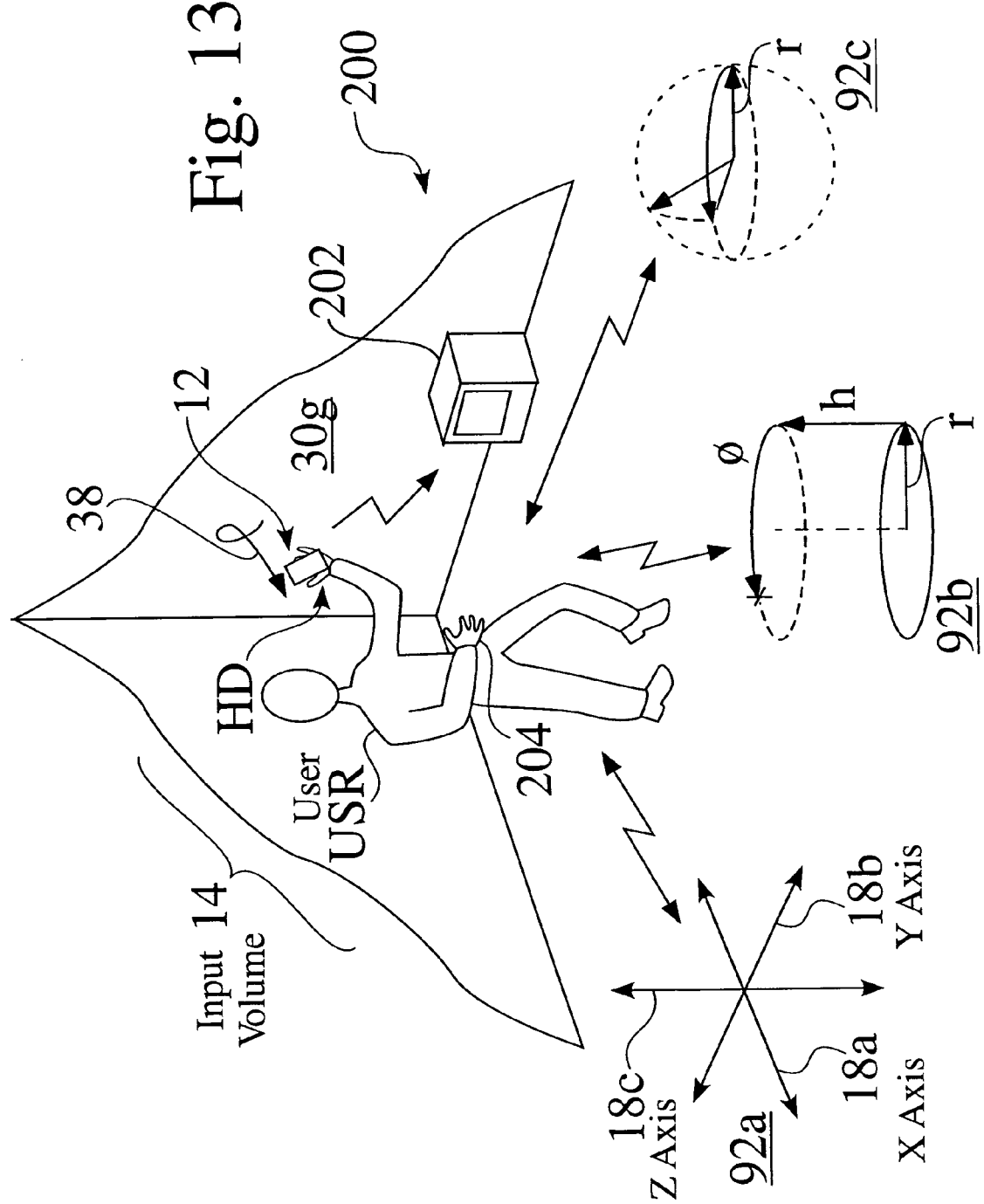

SELECTIVE INPUT SYSTEM BASED ON TRACKING OF MOTION PARAMETERS OF AN INPUT DEVICE

CROSS REFERENCE TO RELATED APPLICATIONS

This Application also claims priority for U.S. Provisional Patent Application Ser. No. 60/504,552, entitled SELECTIVE INPUT SYSTEM BASED ON TRACKING OF MOTION PARAMETERS OF AN INPUT DEVICE, US Filing Date 19 Sep. 2003.

This Application is a Continuation In Part of U.S. patent application Ser. No. 10/677,890 (TEGI0013), entitled DIRECTIONAL INPUT SYSTEM WITH AUTOMATIC CORRECTION, US Filing Date 01 Oct. 2003 now U.S. Pat. No. 7,286,115, which claims priority to U.S. patent application Ser. No. 10/205,950, filed 25 Jul. 2002; to U.S. patent application Ser. No. 09/580,319 filed 26 May 2000, entitled KEYBOARD SYSTEM WITH AUTOMATIC CORRECTION; and to U.S. Provisional Patent Application Ser. No. 60/461,735, filed 09 Apr. 2003.

FIELD OF THE INVENTION

The invention relates to input devices and user interfaces. More particularly, the invention relates to the tracking of the position and/or motion of an input device and selection of items or character input based on the tracking.

BACKGROUND OF THE INVENTION

Input devices often comprise means for pointing or selecting, such as by a stylus, finger, or mouse, whereby a user may interact with a device. The user is often required to interact with a user interface, such as a keypad, touchpad, or touch screen, such as to input a desired character. A user typically maneuvers the pointing or selection device over a desired position over the interface, and then taps or sets the pointing device, to activate a chosen region or element, e.g. such as an actual or mapped keypad element or character.

A user is often required to perform a large number of selective pointing actions, which can be difficult to perform, and are prone to error.

Furthermore, the user interfaces for many devices are often small, such as for small electronic devices, e.g. portable cell phones, personal digital assistants (PDAs), or other devices often used for business, personal, educational, or recreational purposes. The selective pointing functions required to operate such small devices have become increasingly difficult and prone to error, as a user must accurately tap on a very small region within a user interface.

Several structures and methods have been described, to facilitate the entry of information within stylus-based devices.

For example, in a Palm personal digital assistant (PDA), available through Palm Inc., of Milpitas, Calif., a handwriting recognition system, such as Graffiti®, is provided, wherein a user, preferably with a stylus, enters shorthand-style simplified patterns within a designated entry region of an input screen. Entered motions are analyzed to determine the entered characters, which are then placed within an "active" or cursor region for the device. For example, for a cursor location corresponding to time, e.g. 2:30 PM, within a schedule application, a user may enter "Meet with Fred".

Shumin Zhai and Per-Ola Kristensson, Shorthand Writing on Stylus Keyboard, Apr. 5-10, 2003, describe a method for computer-based writing, wherein a shorthand symbol is provided and taught for each word, according to a pattern on a stylus keyboard. A gesture pattern is typically made by tapping the first letter of a word, and gliding the stylus over to subsequent characters in a word. A word is recognized by the pattern of the gesture over the keyboard.

Jennifer Mankoff and Gregory D. Abowd, Error Correction Techniques, submitted to Interact '99, provides a survey of the "design, implementation, and study of interfaces for correcting error prone input technologies".

Jennifer Mankoff and Gregory D. Abowd, Cirrin: A Word-Level Unistroke Keyboard for Pen Input, Proceedings of UIST 1998, Technical note. pp.213-214, describe a structure and method for planar entry of words, with a non-planar motion typically used between words. Keyboard designs are described, in which letters are arranged about the periphery of a neutral area. Each word is begun by starting a stylus path within a central, ie. neutral region. A user is then required to trace out a path which crosses, i.e. travels through, selected letters, while entering the central, neutral region as necessary, between successive letters.

K. Perlin, Quikwriting: *Continuous Stylus-Based Text Entry*; presented at A C M UIST'98 Conference, describes a shorthand for entering text, wherein the x,y positions of a stylus on a surface are tracked. The surface includes nine zones, including a central resting zone. A token is created whenever the stylus enters or exits any of the zones, and the sequence of tokens is used to determine the entered characters. The system typically requires that the stylus begin each word from a central resting zone. The system also often requires movement between two zones for the determined selection of most characters, while for characters which are defined to be "frequent", the movement from a central resting zone to an outer zone and back to the resting zone can be used.

M. Garrett, D. Ward, I. Murray, P. Cowans, and D. Mackay, *Implementation of Dasher, an Information Efficient Input Mechanism*, presented at LINUX 2003 Conference, Edinburgh, Scotland, describe a text entry system which uses "a language model to offer predictions to the user without constraining the range of words which can be written", such as for "providing input on keyboardless devices and for disabled users". The input system presents letters which move across a screen, wherein a user navigates a cursor into the zones for each letter. Zones for common letters, based on letters and words already presented, are bigger.

Other work describing text input technologies is provided by P. Isokoski and R. Raisamo, Device Independent Text Input: A Rationale and an Example, Proceedings of the Working Conference on Advanced Visual Interfaces AVI2000, pages 76-83, Palermo, Italy, 2000; P. Isokoski, *Text Input Methods for Eye Trackers Using Off-Screen Targets*, In Proceedings of Eye Tracking Research & Applications Symposium 2000, pages 15-22. ACM, 2000; P. Isokoski, *Model for Unistroke Writing Time*, CHI Letters: Human Factors in Computing Systems, CHI 2001, 3(1):357-364, 2001; P. Isokoski and M. Käki. *Comparison of Two Touchpad-Based Methods for Numeric Entry*, CHI Letters: Human Factors in Computing Systems, CHI 2002, 4(1): 25-32, 2002; P. Isokoski and I. Scott MacKenzie, *Text Entry on Mobile Systems: Directions for the Future*, CHI 2001 Extended Abstracts, page 495, 2001; P. Isokoski and I. S. MacKenzie; *Report on the CHI2001 Workshop on Text Entry on Mobile Systems*, SIGCHI Bulletin, p. 14, September/October 2001; P. Isokoski and I. S. MacKenzie. *Combined Model for Text Entry Rate Development*, CHI2003 Extended Abstracts, pp. 752-753, 2003; P. Isokoski and R. Raisamo, *Architecture for Personal Text*

*Entry Methods*, In *Closing the Gaps: Software Engineering and Human-Computer Interaction*, pp. 1-8. IFIP, 2003.

While such entry systems provide a means for entering information, the required shorthand or stylus paths are often complex, and movements required for one character are easily mistaken for different characters. A user is therefore often required to retype one or more characters, if the mistakes are even noticed.

It would be advantageous to provide an input system that makes selection or character input based on determined motions of input device over an area, i.e. the individual characteristic motions which, as a whole, make up a pattern. The development of such a user input system would constitute a major technological advance.

It would also be advantageous to provide a user input system, wherein selections of items or characters are determined, i.e. distinguished, by detecting parameters of motion of an input device, such as length of motion, a change in direction, a change in velocity, and/or a pause in motion, at locations that correspond to features on the keyboard/pad. The development of such a user input system would constitute a major technological advance.

As well, it would be advantageous to provide an input system which makes selection or character input based on the motion of input device over an area, which is coupled to a text disambiguation system such as T9® or SloppyType™ system, to improve the accuracy and usability of the input system. The development of such a user input system would constitute a further major technological advance.

SUMMARY OF THE INVENTION

A selective input system and associated method are provided, which track the motion of an input device over an area. The input device can be a touchpad, a mouse, a pen, or any device capable of providing a location, e.g. such as an x-y location and/or a location based on alternate or additional dimensions. The area is preferably augmented with a printed or actual keyboard/pad. Alternatively, a representation of the location of the input device over a virtual keyboard/pad can be dynamically shown on an associated display. The system identifies selections of items or characters by detecting parameters of motion of the input device, such as length of motion, a change in direction, a change in velocity, and or a lack of motion at locations that correspond to features on the keyboard/pad. The input system is preferably coupled to a text disambiguation system, such as a T9® or SloppyType™ system, to improve the accuracy and usability of the input system.

BRIEF DESCRIPTION OF THE DRAWINGS

FIG. 12 is a schematic view of an alternate selective input system based on the tracking of motion and/or position of a pointing device, wherein the input area is changeable for function and/or appearance; and FIG. 13 is a perspective view of an alternate selective input system based on the tracking of motion of an input device through a region or volume.

DETAILED DESCRIPTION OF PREFERRED EMBODIMENTS

Figure 1:
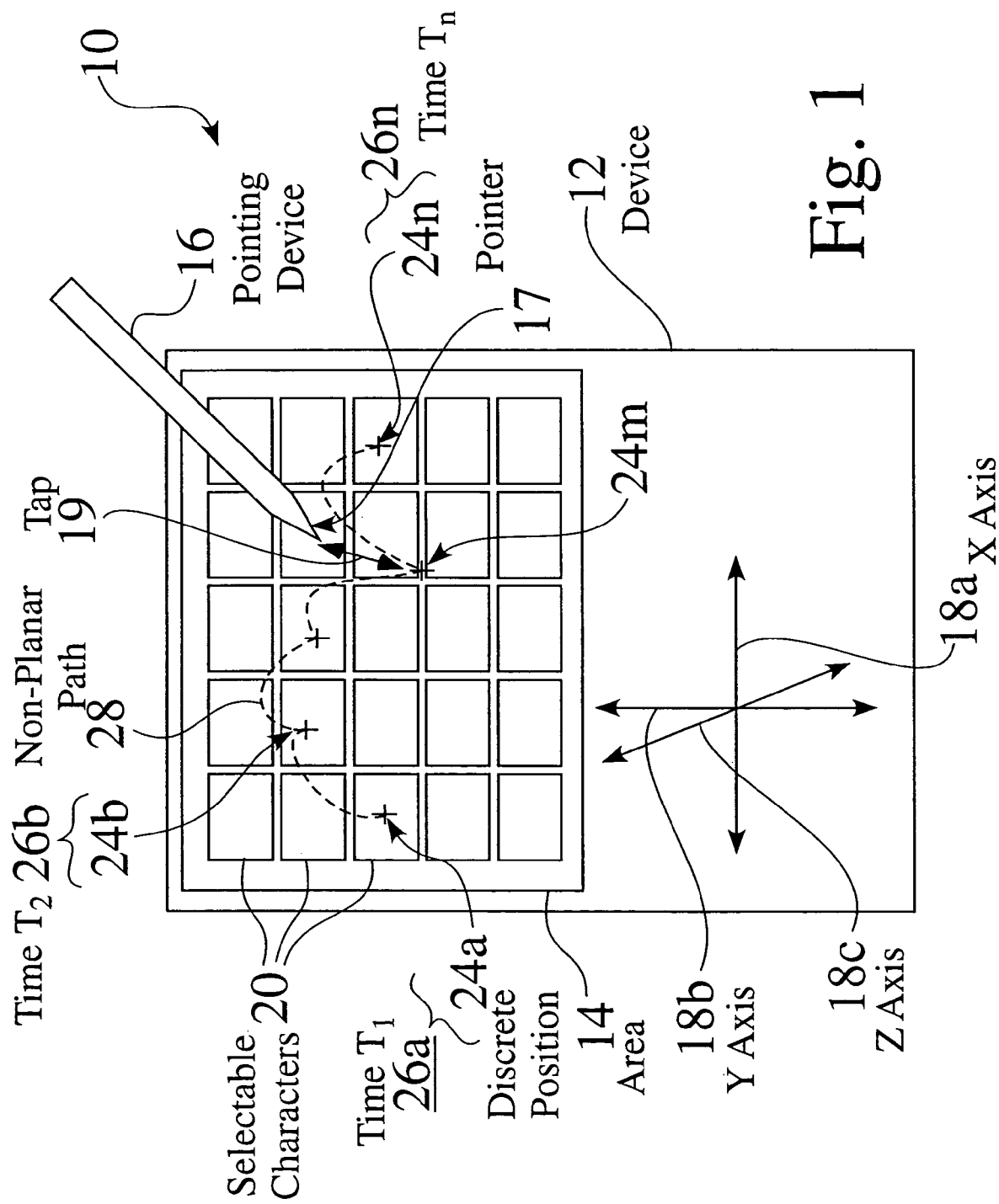
FIG. 1 is a schematic view of a character input system, in which discrete positions of an input device within an input area are determined.

FIG. 1 is a schematic view of a user input system 10, in which discrete positions of a pointing device, i.e. instrument 16 within an input area 14 are determined. Devices 12 often comprise means 16 for pointing or selecting, such as by a stylus, finger, or mouse, whereby a user may interact with a device 12. The user is often required to interact with a user interface area 14, such as a keypad, touchpad, or touch screen, such as to input a desired character 20.

In the user input system 10 shown in FIG. 1, a user typically maneuvers the pointing or selection device 16 over a desired position 24, e.g. 24a, over the interface area 14, and then taps or sets 19 the pointing device 16, such as by contacting a pointing tip or pointer 17 to a desired location 24 within an interface area 14, to activate a chosen region or element, e.g. such as an actual or mapped keypad element or character 20.

As described above, a user is often required to perform a large number of selective pointing actions 19, which can be difficult to perform, and are prone to error. Furthermore, the user interfaces 14 for many devices 12 are often small, such as for small electronic devices, e.g. portable cell phones, personal digital assistants (PDAs), or other devices often used for business, personal, educational, or recreational purposes. The selective pointing functions 19 required to operate such small devices have become increasingly difficult and prone to error, as a user must accurately tap 19 on very small regions within a user interface.

Figure 2:
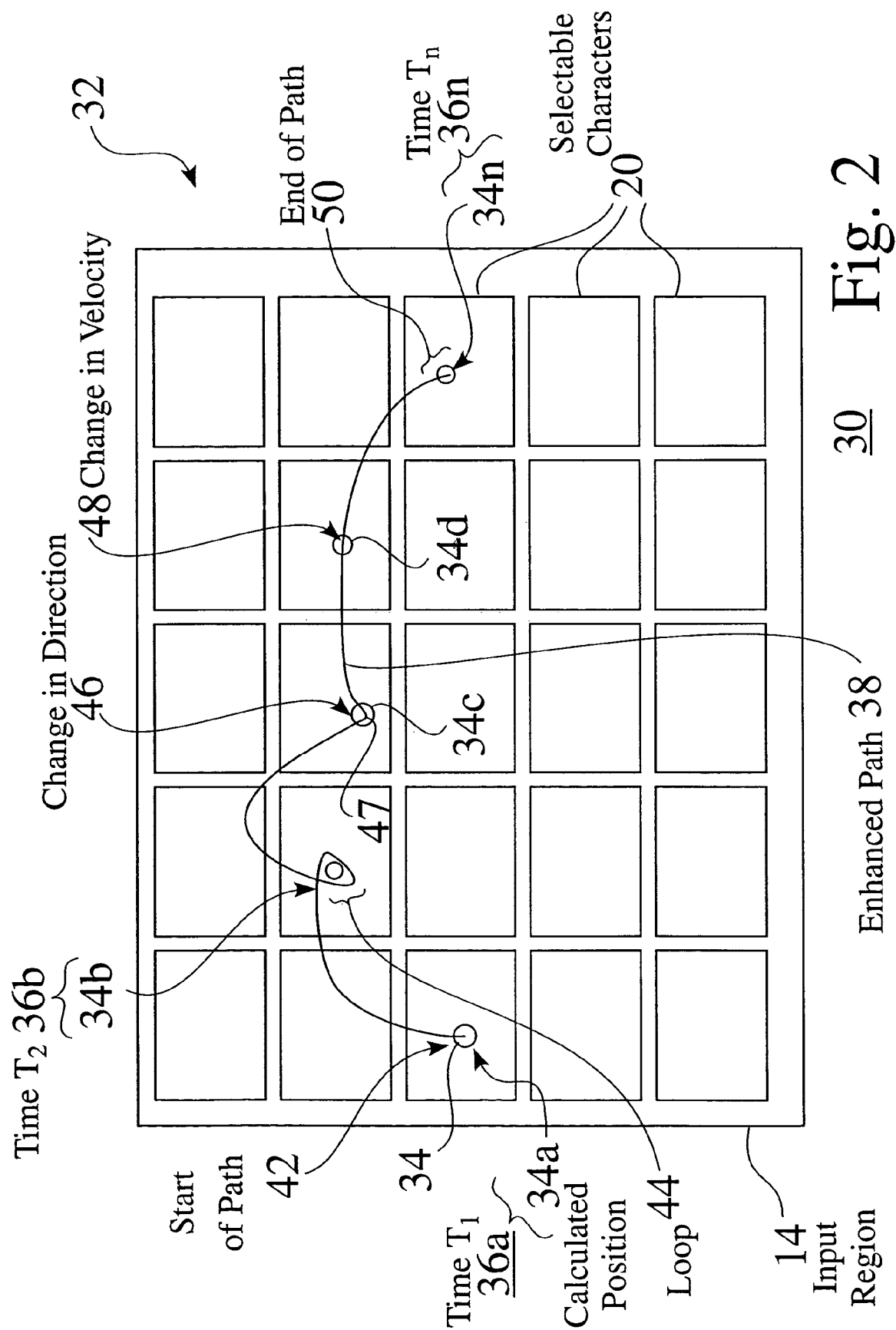
FIG. 2 is a detailed schematic view of a character input system based on exemplary movement and time-based tracking of an input device.

FIG. 2 is a detailed schematic view 32 of a selective input system 30 based on exemplary movement paths 38 and time-based tracking 34, e.g. 34a-34n, of a pointing device 16, such as within an input region 14, such as an area or volume 14. The system 30 and associated process 98 (FIG. 8) identifies character selections, by detecting path starts 42, directional changes 46, velocity changes, e.g. motion pauses 48, and/or path ends 50, at or determined to be near to locations that correspond to features within the input region 14.

As seen in FIG. 2, a path 38 of a device 16 may indicate selected positions 34 by one or more techniques, such as by the start 42 of a path 38, a determined loop 44 in the path 38, a direction change 46, a velocity change, e.g. slowing down or pausing in a location 34, an acceleration away from a location 34, or the end 50 of a path 38. One or more of selected position techniques may be implemented within a selective input system 30, and may also be integrated with the use of pointing or tapping 19 (FIG. 1), such that a device 12 may be easily and intuitively operated by a user.

For example, causing the pointing device 16 to hover over a character 20 for a certain amount of time 36 can be interpreted as a selection of the character 20. Moving the pointing device 16 towards and away from a character 20, such as to and from and from a character 20, i.e. changing direction 46, can be interpreted as a selection 20. Circling 44 a character can be interpreted as a selection. A slowing down or pausing 48 motion over a character 20 can also be interpreted as selection of a character 20.

Figure 6:
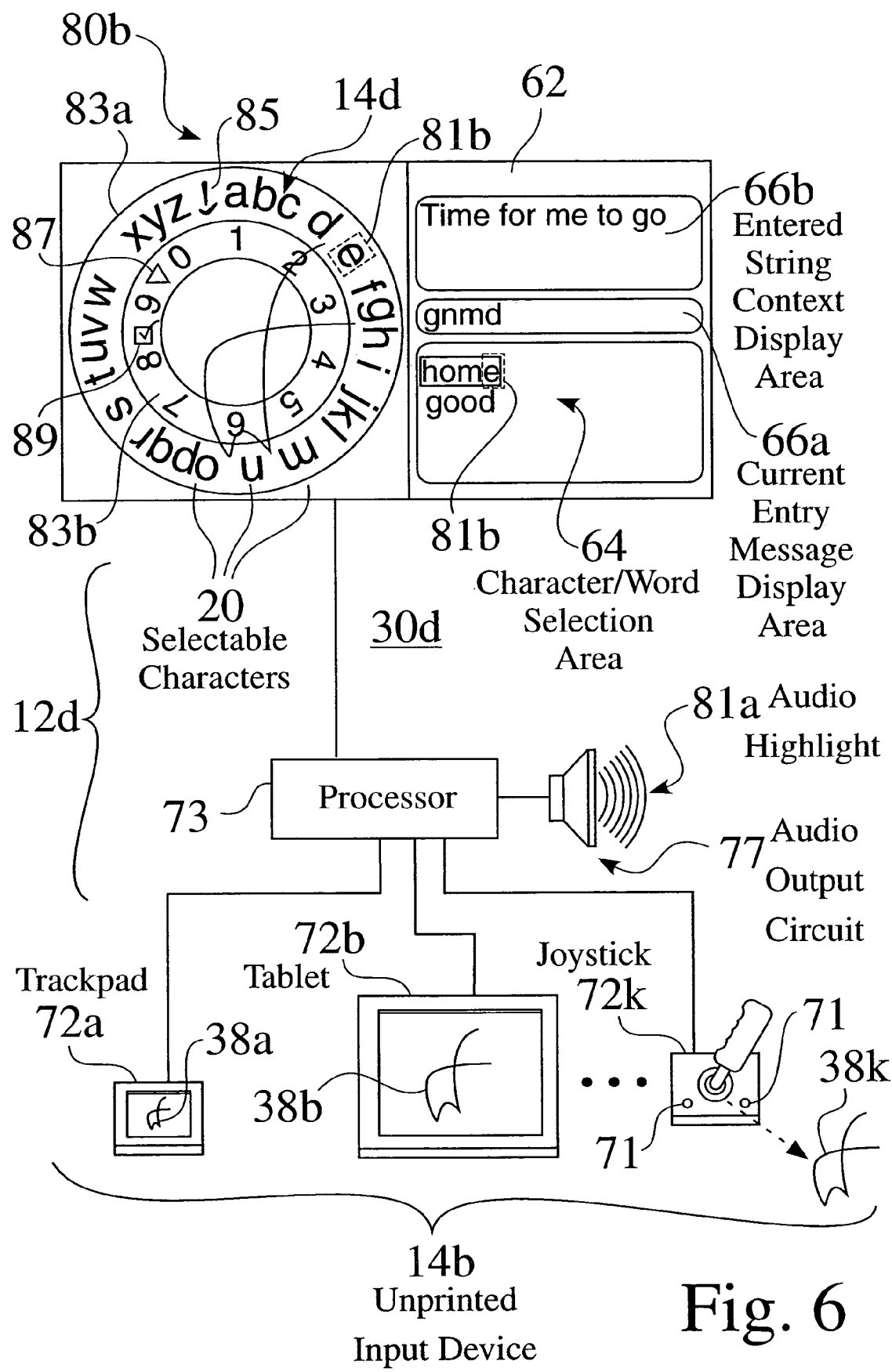
FIG. 6 is a schematic view of a selective input system comprising a circular onscreen input area.

While the exemplary selective input system 30 shown in FIG. 2 is based on two-dimensional movement 38 and time-based tracking 34, e.g. 34a-34n, of a pointing device 16, within an area 14, alternate system embodiments of the selective input system 30 provide three-dimensional tracking, such as in relation to an X-axis 18a, a Y-axis 18b, and a Z-axis 18c, or in relation to other coordinate systems 92, e.g. 92a-92c (FIG. 6).

While the change in direction 46 in FIG. 2 is shown to occur within a small area, comprising a small radius of curvature 47, a change of direction may alternately be determined by other path geometries or characteristics, e.g. such as but not limited to a change in direction over a curve having an estimated radius that is less than a threshold geometry, a sharp cusp edge in a path, or a comparison of path direction before and after a curve or cusp, e.g. such as a change in direction greater than a threshold angle may be used to signify a selection location 34.

In some system embodiments, circling the same selectable region or character 20 multiple times can be interpreted as selecting the character multiple times. Similarly, movement back and forth over a selectable region or character 20 can be interpreted as selecting the same character 20 multiple times.

The selective input system 30 may be implemented on a wide variety of devices 12, such as but not limited to personal computers, mobile devices, appliances, controls, and other microprocessor-based devices, such as portable digital assistants, network enabled cell phones, or other devices often used for business, industrial, personal, educational, or recreational purposes.

Figure 3:
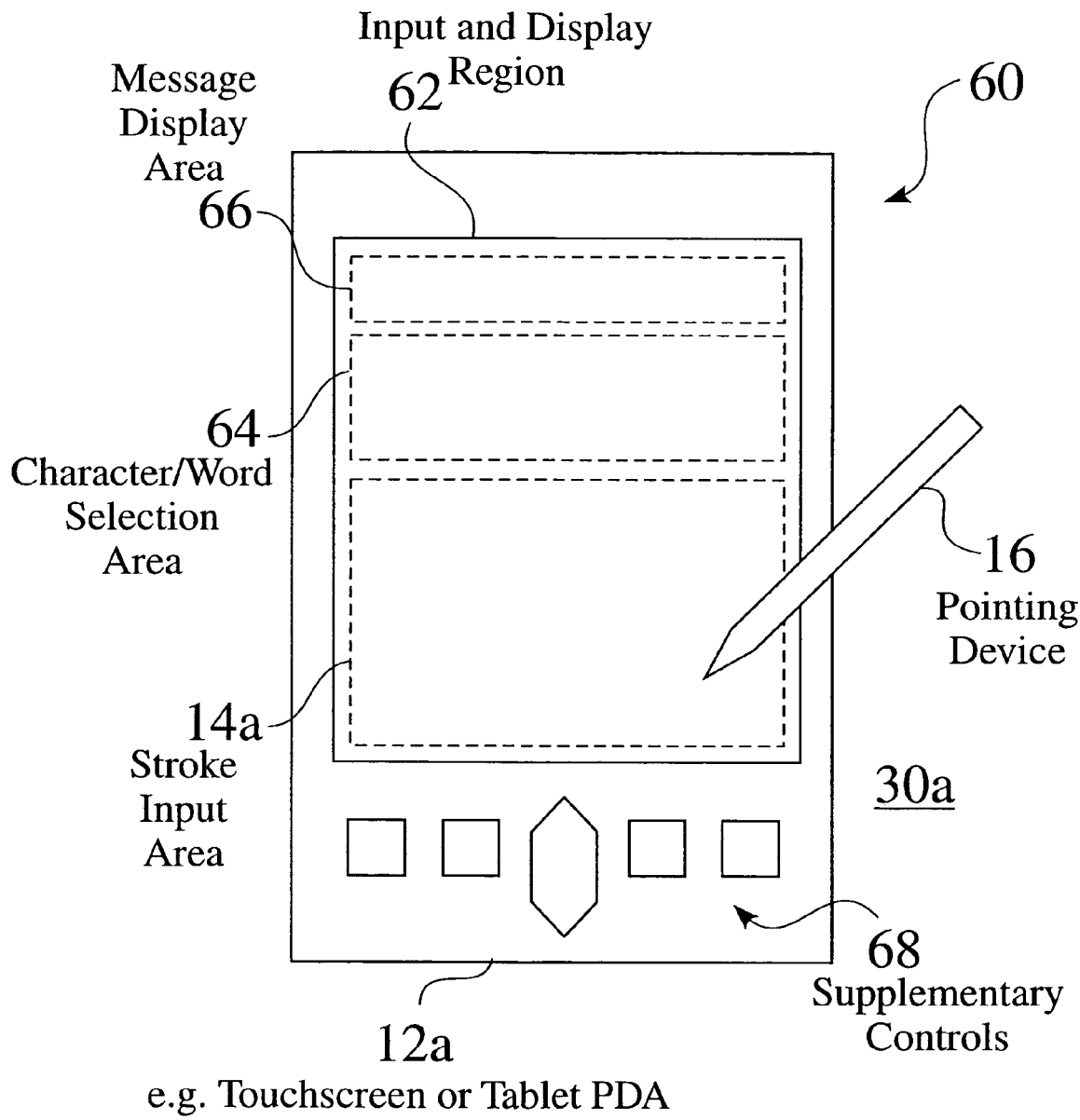
FIG. 3 is a schematic view of a touch screen, wherein stylus input and char/key display preferably share a common interface.

FIG. 3 is a schematic view 60 of a touchscreen device 12a, such as a personal digital assistant (PDA) or a tablet personal computer (PC), where the stylus input and char/key display are effectively the same. A combined region 62 typically comprises a stroke input region 14a, as well as a display region 64, such as to display characters, words, or keys. The combined region 62 may also preferably provide a message display region 66. The device may also comprise supplementary controls 68, such as for navigation within or between device functions.

Figure 4:
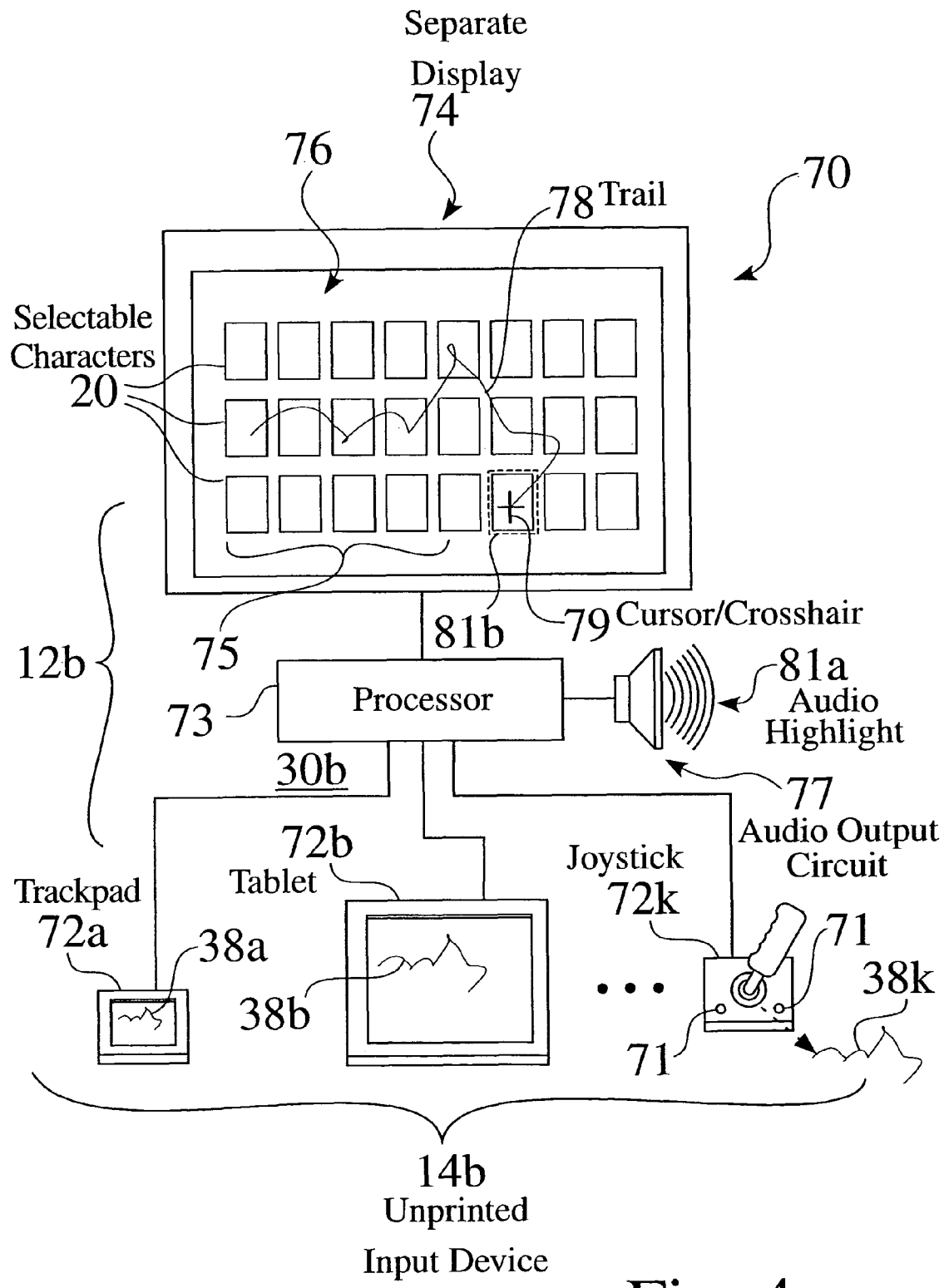
FIG. 4 is a schematic view of an alternate device structure, comprising one or more unprinted inputs linked to a separate display.

FIG. 4 is a schematic view 70 of an alternate device structure 12b, comprising an unprinted input 14b, e.g. such as a trackpad 72a, a tablet 72b, and/or a joystick 72k, linked, such as through a processor 73, to a separate display 76. Selectable movement 38, e.g. 38a-38k, through the input device 14b, e.g. 72a-72c, is tracked, and the path 38 in the input device 14b is indicated in a corresponding displayed path 78, e.g. such as through one or more determined paths 78, i.e. ink trails 78, and/or mouse/crosshair cursors 79. Detected movement paths 38, in relation to the input device 14b, are typically indicated within a char/key area 75, such as in relation to selectable characters, words, items, or keys 20a-20n.

As seen in FIG. 4, an optional ink trail 78 provides a means for visual feedback for hardware configurations 12 in which a char/key area 75 (FIG. 4) is displayed on a screen. In some preferred embodiments, the appearance of the displayed ink trail 78 can change, e.g. color or thickness, to indicate that a selection region has been registered, and/or to indicate a level of system confidence that motion in a region was properly interpreted as a selection.

The ink trail 78 can additionally be enhanced, such as by a highlight, an illumination, a sparkle, or a blinking selection 20, to indicate one or more interpreted selections. In some preferred systems 30b, an ink trail 78 comprises an alternate or complementary audio highlight 81a through an audio output circuit 77. For example, the audio highlight 81a can provide audio feedback to a user USR, such as a tone that rises and falls or fades, wherein the pitch or timbre may preferably indicate system confidence in tracking 34 or a selection 20. Audio highlighting 81a is often preferable for spatial, i.e. 3-dimensional, system embodiments 30g (FIG. 13).

In some system embodiments of the selective input system 30, such as in the selective input system 30b shown in FIG. 4, an auxiliary visual feedback 81b may preferably be provided, such as to display and/or magnify a selectable position 20, such as a selectable area or letter 20, which is determined to be closest to the current tracked location 34. For example, in systems 30 which comprise a printed trackpad 72a or touch screen 72b, where a finger is the primary pointing device 16, and/or in low-light situations, the nearest letter 20 or the immediate selectable area surrounding the current location 34 being tracked may be displayed or magnified 81b, such as in or over the display 74. The visual highlight 81b provides a user USR a visual indication 73 of where the pointing device 16 is currently located 34, i.e. making contact, such as to increase selection accuracy for a pointing device 16, for example when a finger of a user USR blocks a portion of the keyboard area from view, or for lighting conditions which disable viewing.

Figure 5:
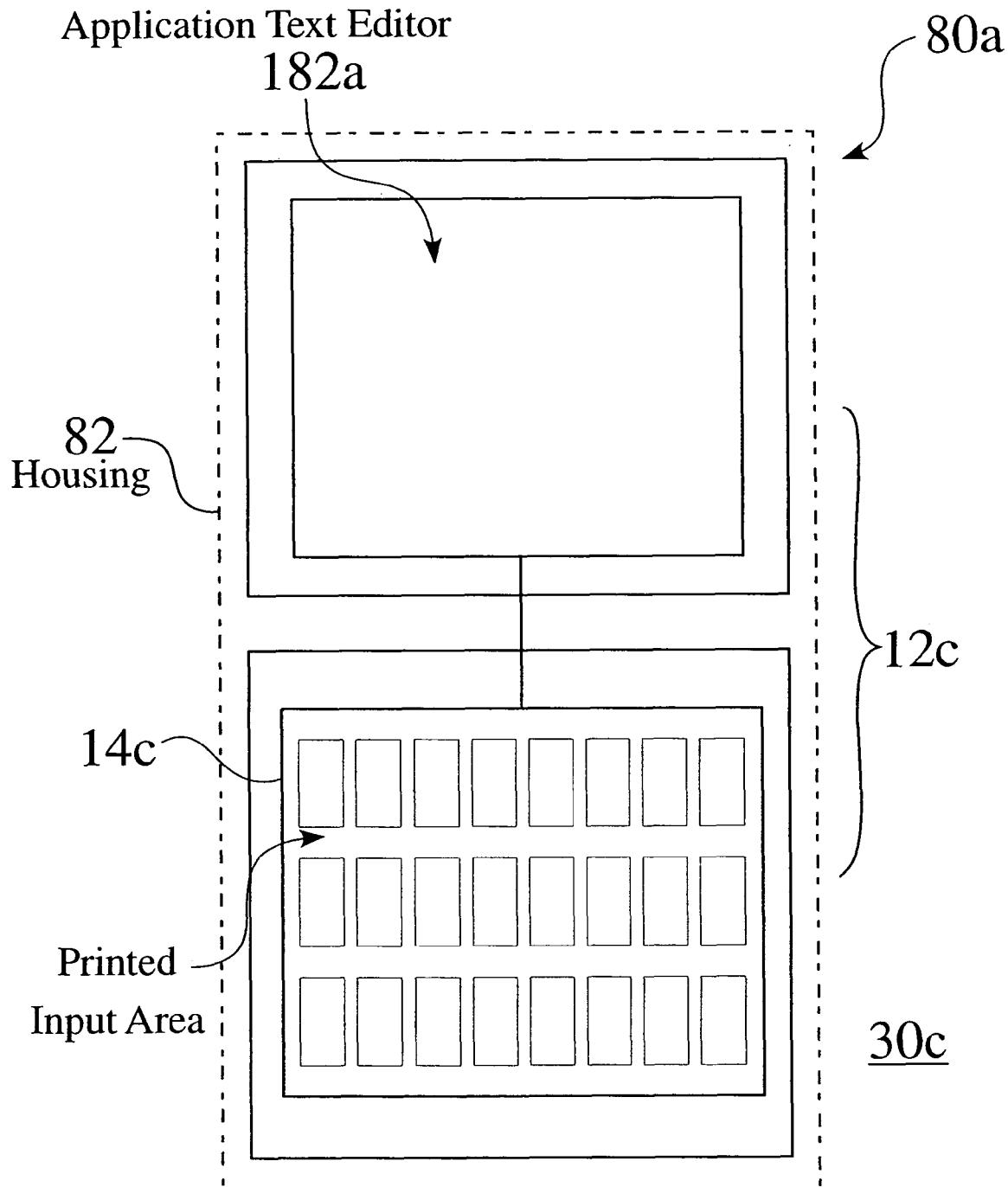
FIG. 5 is a schematic view of a printed entry pad and an output and/or editor display.

FIG. 5 is a schematic view 80a of a device 12c comprising a printed input area 14c, such as a trackpad and/or labeled phone keypad, which provides a permanent character/key area. The input area 14c is linked to a text output display window 182a, for the display of word choice lists, and/or for a text editing display.

FIG. 6 is a schematic view 80b of a device 12d comprising an exemplary non-rectangular, e.g. circular, onscreen input area 14d, corresponding to a selective input system 30. The screen includes an on-screen keyboard 14d and a text display area 62. In alternate system embodiments, the selectable characters 20 may be printed around the joystick device 72k.

The on-screen keyboard area 14d can take a variety of shapes, including but not limited to circle, square, oval and polygon with any number of sides. The visual representation is typically, but not limited to, a two-dimensional plane figure. The on-screen keyboard 14d may be enhanced by, or even replaced with, a set of compass point letters, such as 'A', 'H', 'N' and 'U'. These compass pointer letters can also be placed in an interactive pointer/cursor on screen or even around the input device 14b, such as around a joystick device 72k.

The letters in the on-screen keyboard 14d can be arranged in any order or orientation. In the preferred layout as shown in FIG. 6, all letters 20 have their bottoms towards the center of the first ring 83a. In an alternative layout, all letters 20 may be upright. In the preferred layout as shown in FIG. 6, the letters are ordered alphabetically. In an alternative layout, the letters may follow the Dvorak order. In the preferred layout as shown in FIG. 6, the letters start at the 12 o'clock position. In an alternative layout, the letters may start at the 9 o'clock location. Alternatively, the letters may have a moving starting position in a rotating keyboard in an embodiment, for example, where the input device is a type of wheel. In the preferred layout as shown in FIG. 6, the letters are placed clockwise in a first character ring 83a. In an alternate layout, the letters may be placed counterclockwise. In the preferred embodiment as shown in FIG. 6, letters 20 occupy different amount of radians depending upon their frequency of use in the language, giving more frequent letters a larger target area. In some system embodiments the sizing of letters 20 can also be dynamic, with letters 20 more likely to follow the just registered letter given more area.

Similarly, selectable digits 20, i.e. "0" through "9", can be arranged in any order or orientation. For example, selectable digits 20 can be located adjacent to the series of letters 20 assigned to the corresponding digit keys on a telephone keypad.

The on-screen keyboard 14d may include letters of a primary input language, letters of alternate input languages (and/or accented letters), digits, and punctuation symbols. The keyboard may also include character components for pictographic languages, diacritics and other "zero-width" characters that attach to preceding characters. The keyboard may further include tone marks, bidirectional characters, functions indicated by a word or symbol, and symbolic representation of a set of characters such as "Smart Punctuation".

The preferred primary text input keyboard as shown in FIG. 6 includes unaccented is letters which form an outer ring 83a, digits which form an inner ring 83b, and a symbol or an indicator 85 between the letters "z" and "a", called "Smart Punctuation", which intuitively determines which punctuation is most appropriate based on the word context.

There may be auditory feedback 81a and/or visual feedback 81b on each joystick movement or button press. For example, as soon as the joystick direction is registered, a solid or gradient-fill pie wedge shape could appear on the keyboard, centered on the current direction of tilt. Further, the width of that pie wedge could narrow in proportion to the tilt of the joystick towards the perimeter. The pie wedge can remain momentarily after the joystick is returned to its center/resting position. The pie wedge provides a visual cue that the tilt of the joystick was registered and reinforces the notion that each action represents a range of possible letters.

Figure 7:
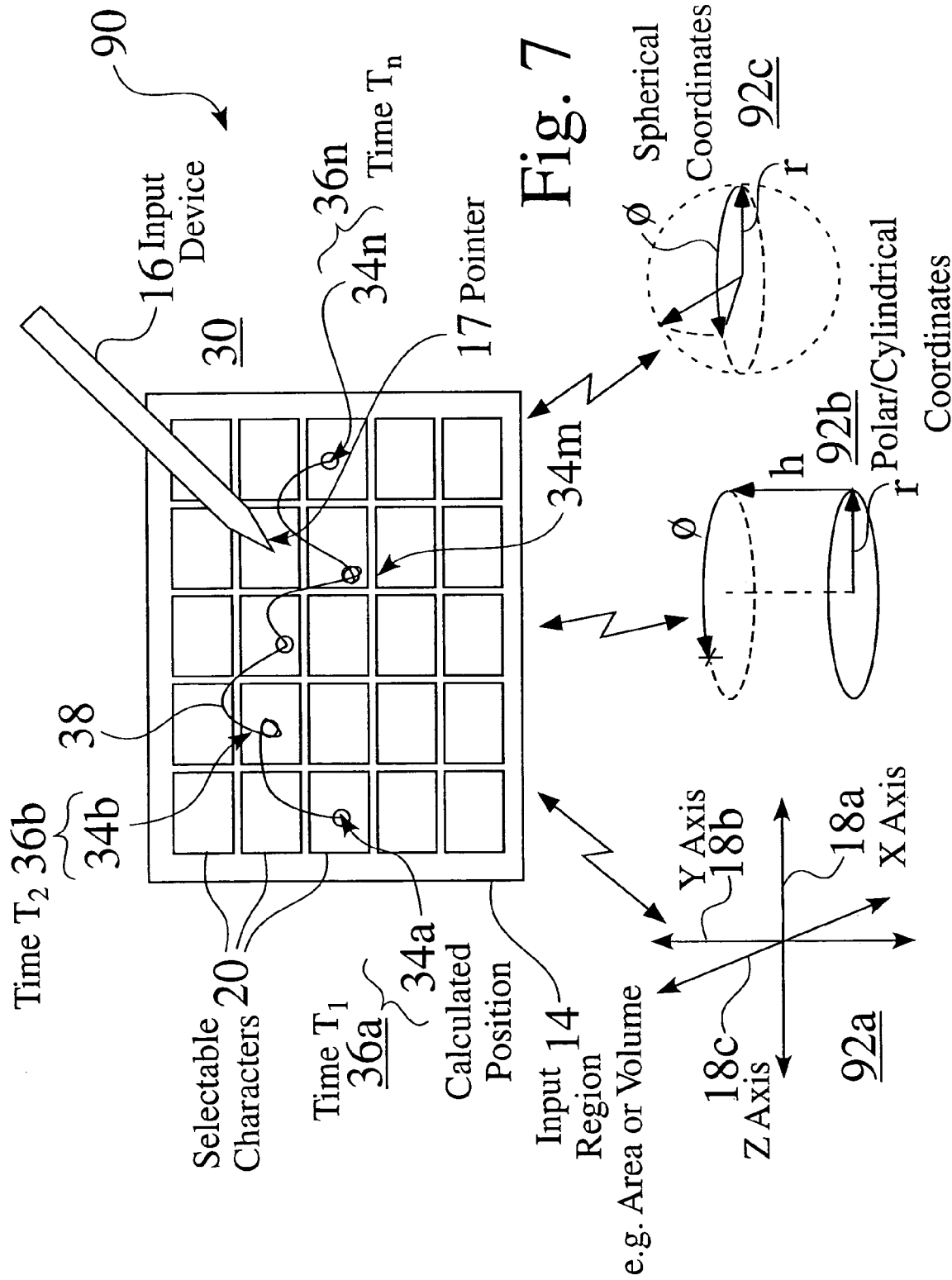
FIG. 7 is a schematic view of a character input system based on the tracking of absolute positions of an input device.

FIG. 7 is a schematic view 90 of a selective input system 30 based on exemplary movement 38 and time-based tracking 48, e.g. relative or absolute, of a pointing device 16. As seen in FIG. 7, movement parameters and/or position parameters are readily made in two or three dimensional systems 92, such as in an orthogonal-axis coordinate system 92a, a cylindrical coordinate system 92b, or a spherical coordinate system 92c.

SloppyType™ in Selective Input Systems. Several embodiments of the selective input system 30, such as systems 30a-30d, as seen in FIG. 3 through FIG. 7, preferably comprise enhanced disambiguation, such as but not limited to SloppyType™ disambiguation.

For example, as shown in FIG. 3 and FIG. 6, the selective input system 30 may include a text display area 62, as well as a word choice list region 64 and/or a message area 66. The exemplary word choice list 64 typically comprises a list of words that the system 30 predicts as likely candidates based on the characters entered by ambiguous directional input. For example, the most likely word is a default word. The user can either accept the default word with one action, or select an alternate word with a combination of actions.

The exact spelling sequence of exact characters coincidentally selected by the user is also displayed 66, e.g. 66a (FIG. 6). Preferably, the spelling sequence is displayed in a separate area 66a, such as above or below the word choice list 64. Alternatively, the spelling sequence may be displayed as an entry in the word choice list 64, typically the first line or the last line. In FIG. 6, the exact spelling sequence 66a is displayed above the word choice list 64.

The last letter 20 entered may also be indicated or highlighted 81, such as on the on-screen keyboard and/or in the exact spell sequence, such as but not limited to font change, color change, reverse video or alternate background color, underline, bold face or italics, and outline. An example of a visual outline or highlight 81b can be a box or a circle.

All the words on a word choice list 64, other than the exact spelling sequence at the time when the exact spelling sequence is displayed as the first or last entry, are ordered by a combination of the shortest calculated distances between the input entry sequence and each letter 20 in each word and the recency of use and/or the frequency of use within the given language.

Figure 11:
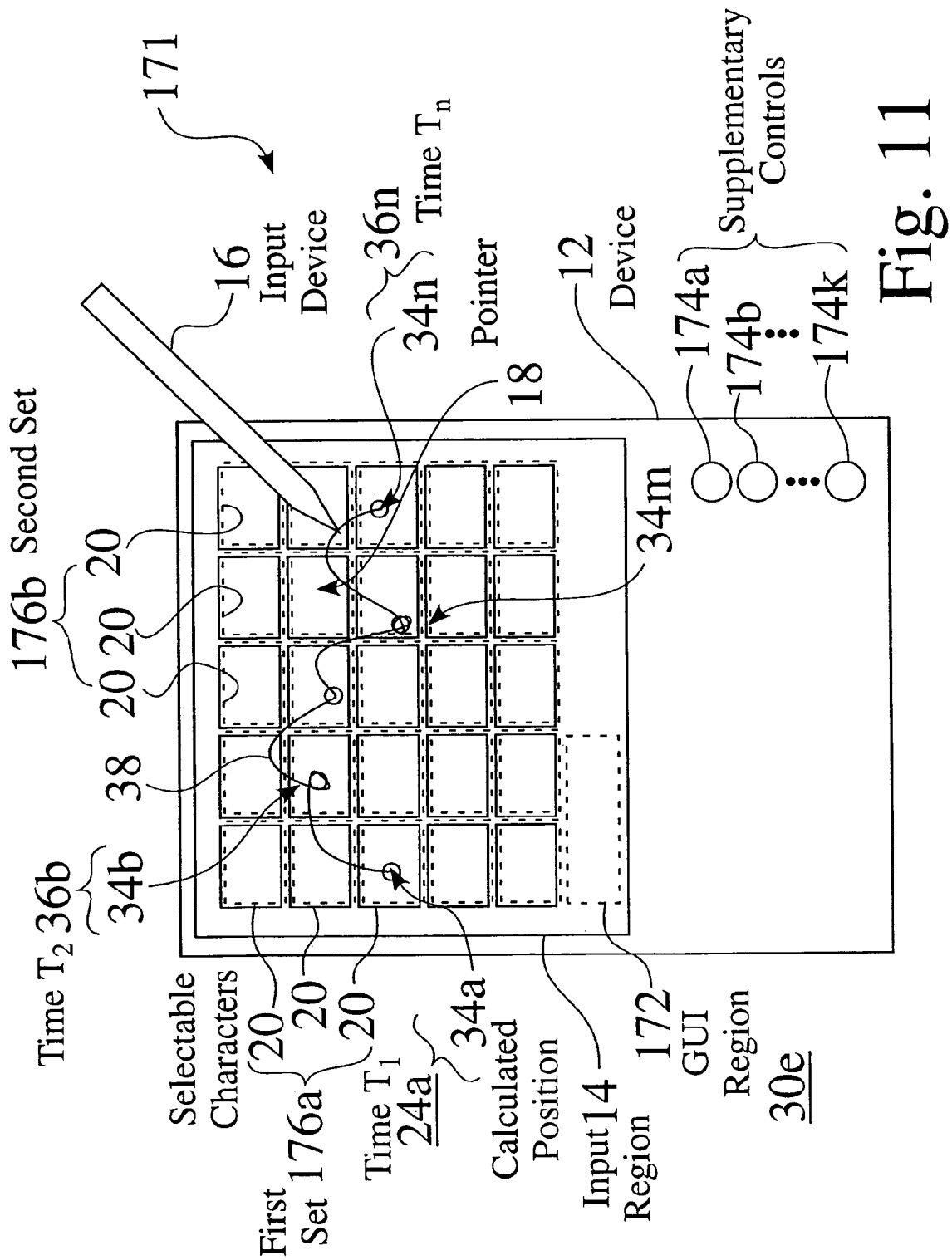
FIG. 11 is a schematic view of an alternate selective input system based on the tracking of motion and/or position of a pointing device, wherein functions of an input region are changeable based on stylus input and/or device controls.

In various embodiments of the selective input system 30, a user can select a specific word from the word choice list, such as through a character/word selection area 64 (FIG. 3), a word choice list or application text editor 182a (FIG. 5), and/or through one or more supplementary controls 174a-174k (FIG. 11). Preferably, the method is consistent with other applications use of scrolling methods and selection button. The system typically comprises a means of selecting the exact spelling sequence as well as any predicted words. In one preferred embodiment, the system comprises a next button and a previous button, with which the user can navigate forward and backward through the word choice list.

In some system embodiments, an "escape hole" 87 is provided, such as located on one or more input rings 83, e.g. 83a,83b (FIG. 6), that allows movement into the word list 64 or to system menus. As well, in some system embodiments, a default/accept character 89 is provided, such as located on one or more input rings 83, e.g. 83a,83b, or elsewhere on the onscreen keyboard 14c, for accepting a current default word and moving on, such as to the entry of another word.

Alternatively, the selective input system 30 may include a selection mode switch button, such as through one or more buttons 71 (FIG. 4) or supplementary controls 174, e.g. 174a-174k (FIG. 11). When a selection mode switch button 71, 174 is pressed, the system enters a selection mode and the directional input means can be used to scroll forward and backward through the word choice list.

In addition, selecting a predicted word using a particular means may replace the exact spelling sequence as if the letters of the selected word had been entered directly by the user, and a new list of predicted words is generated.

The most likely word is the word added if the user does not try to select a different word. The default word may be a copy of the exact spelling sequence if the user was accurate. Alternatively, it may be the selected word as described above. In addition, the exact spelling sequence may become the default word if a precision method or mode (described below) is used to explicitly choose at least one letter in the sequence.

Words that are longer than the number of input device actions registered in the current entry sequence may be included in the prediction list. Alternately, a further means can be provided to extend a selected word with completions. For example, longer words that begin with a selected word may appear on a pop-up list after a button press or directional input, similar to the cascading menus on PC windowing systems.

Once a word is entered, the word is typically displayed in the message area 66a.

Alternatively, the selective input system 30 can be implemented as an input method editor (IME). In this case, the text entered by the system goes into whatever program is actively accepting input from the system. Other applications may be linked to the system, or the system may be incorporated as part of another application. These applications include but are not limited to: instant messaging, electronic mail, chat programs, web browsing, communication within a video game, supplying text to a video game, as well as word processing.

To enter a text message using some embodiments of the selective input system 30, such as but not limited to system 30 shown in FIG. 7, the user points the input device 14 in the general direction of the desired letter, and then continues pointing roughly to each letter in the desired word. Once all letters have been roughly selected, buttons may preferably be used to select a specific word from the list of potential matches. The selected word goes into the message area 66a, which may be an appropriate text application such as email or instant message.

In some three dimensional systems 30, true motion 38 in respect to a z-axis 18c is tracked. In alternate embodiments, such as seen in FIG. 4, through pressure sensitive input from a trackpad 72a, a tablet 72b, or a joystick 72k, pressure-sensitive input information can preferably be used to determine motion and position in respect to three dimensions 92 (FIG. 7), such as in respect to a Z-axis 18c.

The selective input system 30 and associated method 98 are not limited to require unistroke entry, i.e. one single continuous gesture, for a word. The system can piece together any single to multi-region sequences, and wait for the user to choose the best word choice. For example, within an alphanumeric entry area 75, for the entry of the word "hello", the user can drag the stylus 16 from "h" to "e", then tap twice on "l", and stroke up to "o".

Figure 10:
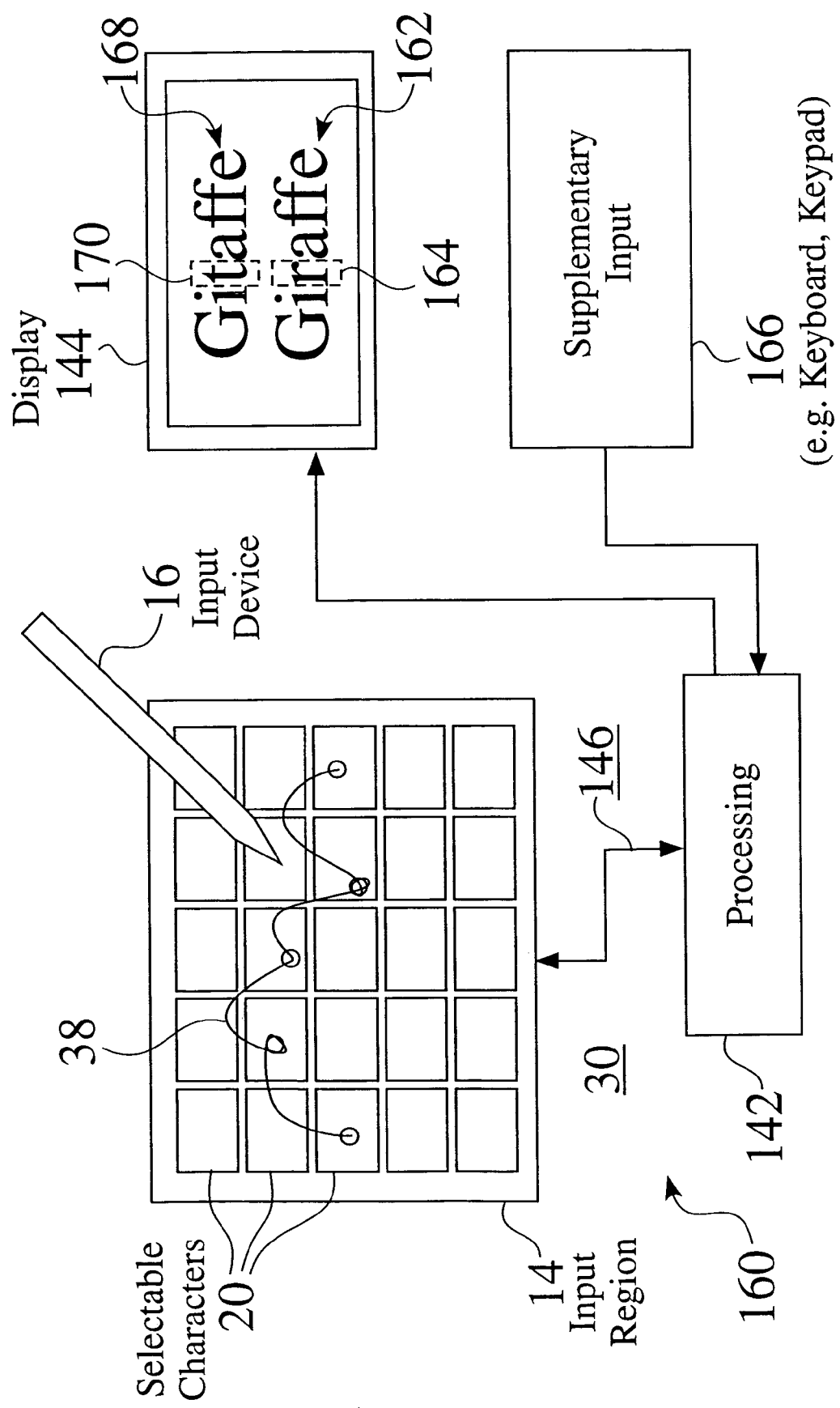
FIG. 10 is a schematic view of preferred processing, input, and display systems associated with an input system based on the tracking of absolute positions of an input device.

Some preferred embodiments of the selective input system 30 further comprise supplementary input 166 (FIG. 10), such as a printed or actual keyboard or keypad 166. Alternatively, a representation of the location 34 of the pointing device 16 over a virtual keyboard or keypad 166 can be dynamically shown on an associated display 144 (FIG. 10).

Figure 8:
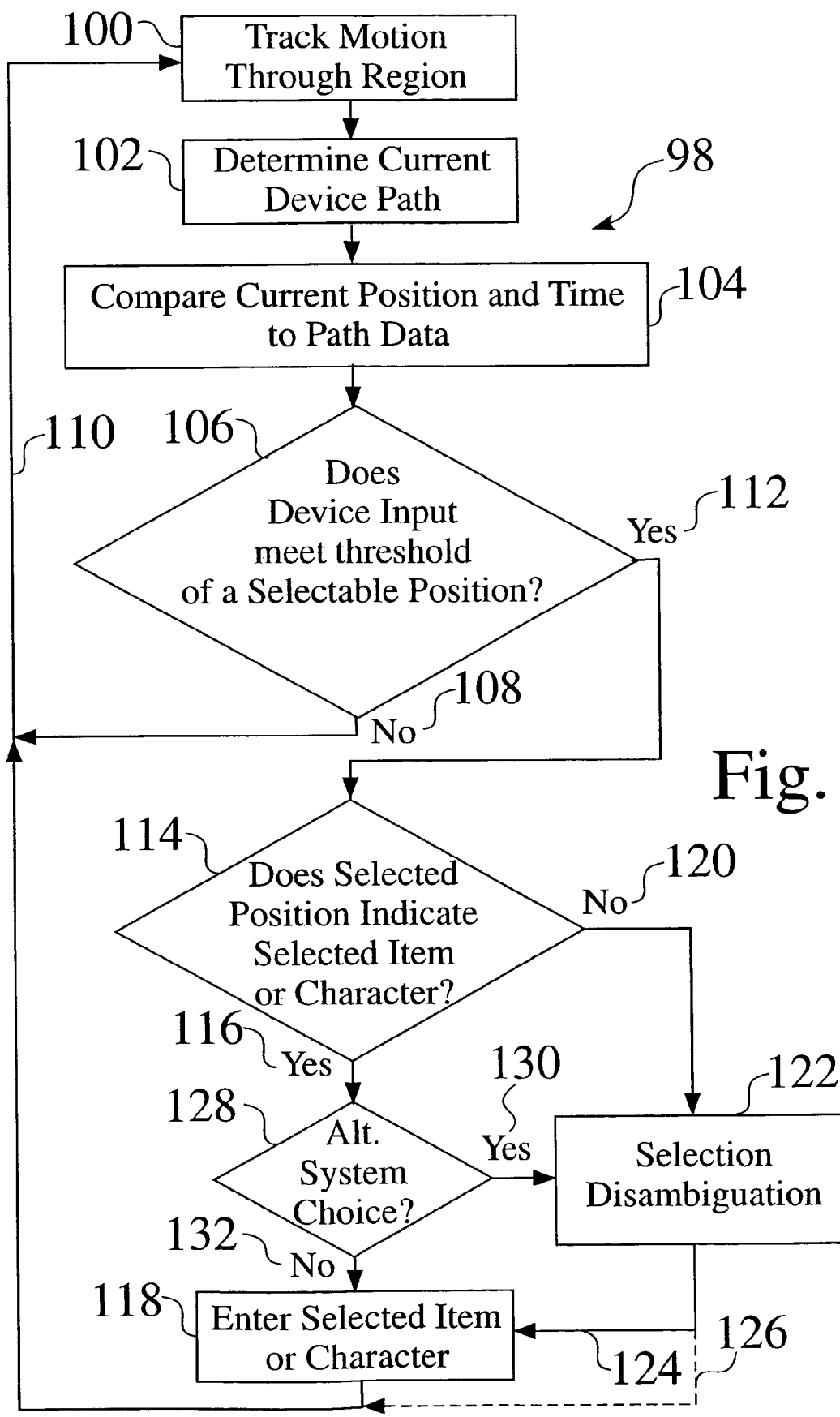
FIG. 8 is a flowchart of an exemplary process for device tracking and character input based on the tracking.

FIG. 8 is a flowchart of an exemplary process 98, implemented on a computer, such as the device 12 or processor 73 (FIG. 4), 142 (FIG. 9, FIG. 10), for device tracking and character input 118 based on the tracking. The system 30 and associated process 98 identify character selections, by detecting changes in direction, changes in velocity, and/or pauses, at locations that correspond to features on the keyboard or keypad.

The motion of a pointing device 16 is tracked 100 over an input region 14, such that the current position 34 of the device 16 is determined 102 at subsequent times 36, thereby defining a device path 38. Once the location 34 and associated time 36 is determined, the location 34 and associated time 36 are compared 104 to path data 38. At decision step 106, the process determines if the current location 34 and associated time 36 meet a threshold of a selectable position or character 20, e.g. such as if the pointing device 16 has changed in direction, changed in velocity, or stopped at a location that corresponds to a feature 20 within the area 14, such as corresponding to a keyboard or keypad element 20. If the threshold decision is negative 108, the process returns 60 and continues to track 100 the motion.

While the exemplary process 98 describes a comparison between a single the location 34 and associated time 36 to the path, one or more points can be analyzed, e.g. such as the current location 34 and the last three to five locations 34, to determine if a discernable selective motion has been made by the user.

If the threshold decision is positive 112, the process decides 114 if the selected position 34 adequately indicates a selected item or character 20, e.g. such as if the identified position 34 is located within or sufficiently near the bounds of a selectable item or character 20. If a selectable item or character 20 is indicated 116, the selected item 20 is entered 118, and the process returns 110 and continues to track 100 the motion. If a selectable item or character 20 is not 120 sufficiently indicated, or if the system 30 determines 130 that an alternate selection 130 may be a valid or more valid choice, some embodiments of the process 98 disambiguate 122 the selection 34,36 if possible 124, and return to track 100 the motion. If an attempt to disambiguate 122 is not successful 126, the system 30, 98 may return to track 100 the motion, such as b y passing over the position, entering a blank character, or prompting the user to correct or reenter the intended selection 20, either by the pointing device 16, or through supplementary input 166 (FIG. 10).

The disambiguation process 122 may comprise a determination of the closest selectable character or item 20, a determination of a group of selections 20, e.g. a word, or a determination one or more likely selections 20, by which a user can either choose from the determined likely selections 20, or may otherwise enter a corrected selection 20. The disambiguation process 122 may alternately comprise a selection of a position or vicinity in the region of multiple characters 20, as opposed to focusing on the selection of a single character 20.

In some embodiments of the input system 30 and associated process 98, the disambiguation function 122 comprises a text disambiguation system 122, such as a T9® or Sloppy-type™ disambiguation system 122, to improve the accuracy and usability of the input system 30.

Details regarding disambiguation systems and processes 122 are seen in U.S. Pat. No. 5,818,437, entitled REDUCED KEYBOARD DISAMBIGUATING COMPUTER; U.S. application Ser. No. 10/677,890, filed 01 Oct. 2003, entitled DIRECTIONAL INPUT SYSTEM WITH AUTOMATIC CORRECTION; U.S. application Ser. No. 09/580,319, filed 26 May 2000, entitled "KEYBOARD SYSTEM WITH AUTOMATIC CORRECTION"; and U.S. Provisional Application 60/461,735, filed 09 Apr. 2003, entitled "DIRECTIONAL SLOPPY TYPE", which are incorporated herein by reference.

Figure 9:
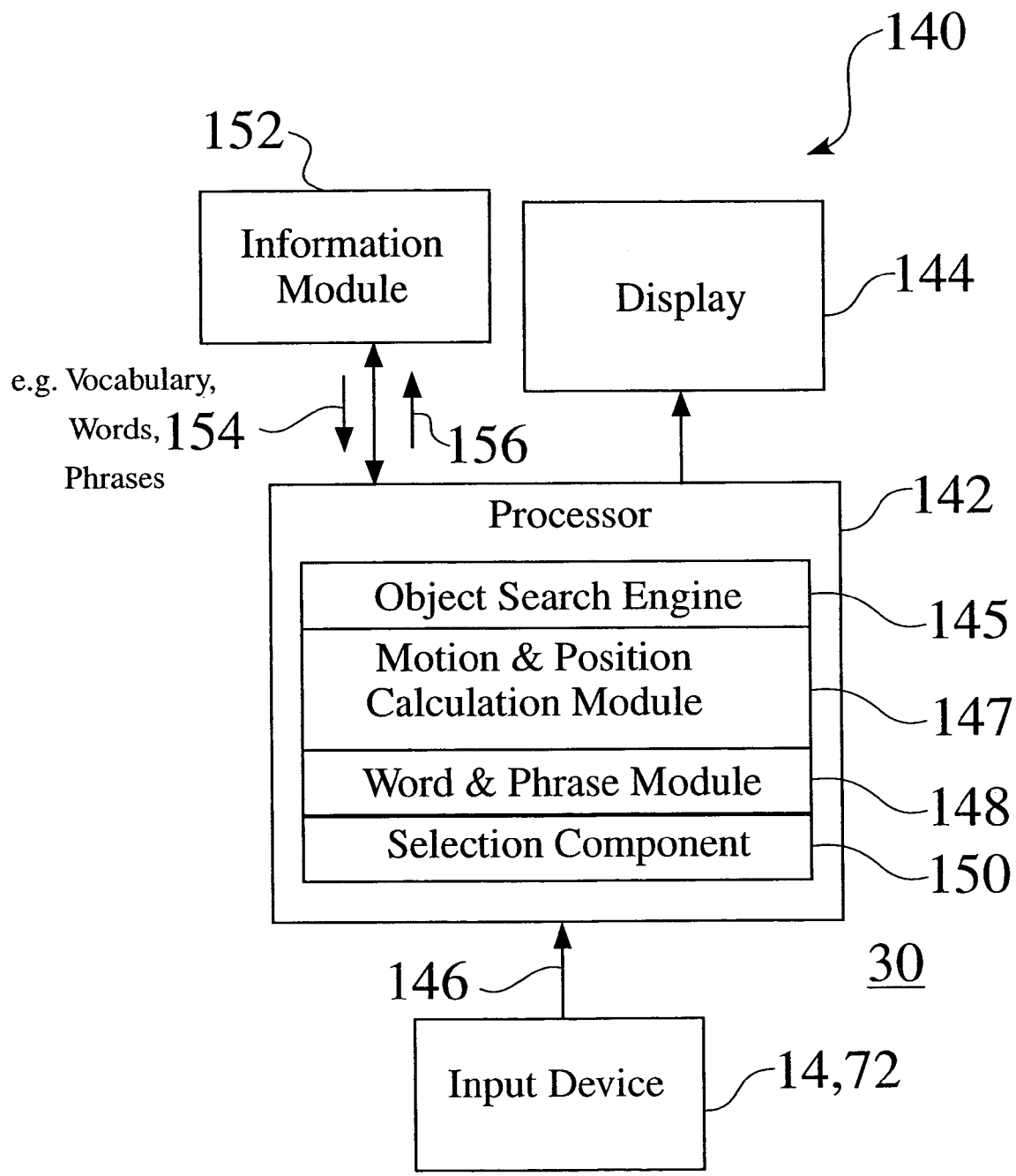
FIG. 9 is a schematic block diagram of a directional input system 160 incorporating disambiguation and associated external information.

FIG. 9 is a block schematic diagram 140 illustrating an exemplary selective input system 30 which comprises disambiguation functionality, according to a preferred embodiment of this invention. The selective input system 30 shown in FIG. 9 includes an analog input device 14, e.g. such as a joystick 72k (FIG. 4), preferably also comprising one or more buttons 71 (FIG. 4), an external information module 152 which typically stores a collection of linguistic objects, e.g. words and/or phrases, a display device 144 having a text display area, and a processor 142. The processor 142, which connects the other components together, further includes an object search engine 145, a motion and position calculation module 147 for calculating distance values, a word and phrase (linguistic object) module 148 for evaluating and ordering words, and a selection component 150. The system 30 may further comprise an optional on-screen representation of a keyboard 75 (FIG. 4) viewable through the display device 144.

As described above, some preferred system embodiments 30 comprise text disambiguation functionality, such as to disambiguate the intended selection 20 of a device, or to provide a user with possible selection choices 20 for one or more selectable characters 20 that are determined to be possible selections, or with word or phrase choices 148 that may potentially be represented by the selection sequence.

For example, on a standard QWERTY keyboard 166 (FIG. 10), selectable buttons 20 for the letters "R", "T", "F", and "G" are located relatively close. For a determined position 24,34 of a pointing device 16 that lies close to the adjoining region of the letters "R", "T", "F", and "G", e.g. location 24m (FIG. 1), a text disambiguation module 72 may determine the likely choices "R", "T", "F", and "G", such as within the display 144, whereby a user may readily choose the listed word that includes the intended selection 20 in the proper position in the character sequence.

FIG. 10 is a schematic view 160 of preferred processing 142, input 146, and display 162 systems associated with an input system 30d based on the tracking of absolute positions of a pointing device 16.

The supplementary input 166 typically comprises a printed or actual keyboard or keypad 166. Alternatively, a representation of the location 24,34 of the pointing device 16 over a virtual keyboard or keypad 166 can be dynamically shown on an associated display 144.

As seen in FIG. 10, a display 144 may be used to display 168 one or more determined selected characters 20, e.g. the misspelled word "Gitaffe", wherein the exemplary determined position 34 of a pointing device 16 for the third letter 170 is "t". In some system embodiments 30, the determined characters 20 are displayed for a user, such that a user may edit one or more selections 20. For example, as seen in FIG. 10, a user may change the third letter "t" to an "r", to produce a corrected word group "giraffe" 164, such as through selection of alternate words from a word list, or through cursor selection 170 of one or more letters or characters, and entry of a desired letter or character 164, typically through reentry of the pointing device 16, or through the secondary input 166.

The input device 14,72 serves as a selection input device, which provides a possibility of directional input with a sufficient precision, preferably 10 degrees or more precise. It may preferable that the default position of the cursor 79 (FIG. 4), if it is shown, is within an active region within a viewable display 144, such as at the center of an onscreen region 75. It is possible to use a joystick device to navigate in two dimensions an on-screen "QWERTY" or "ABC" keyboard, either in the standard rectangular form or in a circular layout. It is also possible to navigate through multiple concentric rings of characters.

Although an analog joystick 72k is described as the selection device 14 in the selection system 160 shown in FIG. 10, any input device 14 that provides the possibility of directional input with a sufficient precision can be used. For examples: omni-directional rocker switch, thumbstick, e.g. IBM TrackPoint™, touchpad, touchscreen, touchscreen and stylus combination, trackball, eye tracking device, trapped-disk sliding switch, steering wheel, Apple iPod™ Navigation Wheel, or Sony's Jog-dial and data glove, e.g. old Nintendo Game Glove, can be used as alternatives.

The input system 30 shown in FIG. 10 provides a method for precisely choosing the letters of a word. The method is useful for entering uncommon names and any word that is not part of the standard language currently active. The method can also be used to change the last character entered by stepping between characters adjacent to the last character entered. To step between characters adjacent to the last character entered, supplementary input 166, such as a forward button and/or a backward button may be used. Once the character 170 entered has been changed 164, the word choice list refreshes to reflect the changes in the predicted words.

Alternatively, the system may be switched to a precision mode and the directional input means may be used to cycle through letters. For example, in a joystick configuration 72k (FIG. 6), to switch to the precision mode, the system may choose to use the degree of joystick tilt from the center. Once the tilt exceeds a preconfigured limit, the system 30 switches to the precision mode. Alternatively, the system 30 may use the time interval that the joystick dwells at the perimeter. Once the time interval reaches a preconfigured limit, the system switches to the precision mode and notifies the user through a visual cue or a tone. The system may also include a button for switching to precision mode.

For example, as seen in FIG. 10, a user may change the third letter "t" to an "r", to produce a corrected word group "giraffe" 164, such as through selection of alternate words from a word list, or through cursor selection 170 of one or more letters or characters, and entry of a desired letter or character 164, typically through reentry of the pointing device 16, or through the secondary input 166.

The linguistic objects that are stored in the information module 152 (FIG. 9) typically comprise but are not limited to: words, phrases, abbreviations, chat slang, emoticons, user IDs, URLs, and/or non-English (such as Chinese or Japanese) characters. Although words are used in the preferred embodiments, any other linguistic objects are equally applicable. Similarly, although the term "letter" or "character" is used in the preferred embodiment, other sub-word components from Non-English languages, e.g. strokes, radicals/components, jamos, kana, plus punctuation symbols and digits, are equally applicable.

The list of predicted or alternate words is typically ordered in accordance with a linguistic model, which may include one or more of: frequency of occurrence of a word in formal or conversational written text; frequency of occurrence of a word when following a preceding word or words; proper or common grammar of the surrounding sentence; application context of current word entry; and recency of use or repeated use of the word by the user or within an application program.

One or more techniques can be implemented within a disambiguation process 122 (FIG. 8). In some situations, even if one or more characters are clearly indicated and selected, the disambiguation process 122 may reject the word, e.g. such as characters within a misspelled word, and offer a choice of correctly spelled alternate words, or may automatically replace the word, e.g. such as for commonly mistyped words or transposed letters. For example, in a situation in which a user USR has clearly entered an "S", the disambiguation process may suggest an "A" or a "D", such as for choices of one or more neighboring selectable characters 20 in a QWERTY keyboard, which may be determined to be logical. Therefore, even if a user USR precisely enters or indicates a selectable position 20, the disambiguation process 122 may provide one or more determined optional choices, e.g. by presenting the user with a display note, such as "Is this alternative choice what you meant to enter?".

As well, the disambiguation process 122 may determine a selection motion at a position which does not clearly indicate a selected position 20 within the input region 14.

While the disambiguation process 122 is readily adapted to provide spell checking, the process 122 can also provide other disambiguation. For example, after entering a complete word or phrase, i.e. following a path 38 that returns multiple character candidates 20 at each spot 34 along the path 38, individual "selected positions 20 can be disambiguated with multiple mechanisms, wherein the mechanism typically uses context, such as the current input or display language, adjacent characters or words, previously used words or phrases, and/or known words or phrases.

Alternate System Embodiments. FIG. 11 is a schematic view 171 of an alternate selective input system 30e based on the tracking of absolute positions of a pointing device 16, wherein functional sets 176, e.g. 176a, 176b, of selectable characters 20 of an input region 14 are changeable, such as based on stylus input 172 and/or device controls 174a-174k. For example, the selectable characters 20 may readily be changed in function to alternate characters 20, and may also be associated with different display characters. For example, stylus input 172 and/or device controls 174a-174k may be used as a shift, option, or control keys, whereby selectable characters are replaced with alternate characters.

In alternate system embodiments 30e, a user does not have to explicitly select an input method, i.e. a set 176 of selectable characters. For example, by simply using the provided interface, such as through screen entry or by pressing one or more keys, the system may automatically switch or adjust to an alternate input set 176.

In alternate embodiments of the selective input system 30, wherein characters or locations are selected, the system 30 preferably provides means for successive or repeated entry of one or more selectable items, characters, and/or locations, such as through action of a pointing device 16, e.g. a loop 44 on or near a selectable item 20, followed by a tap 19 in the same region. As well, supplementary input, such as but not limited to stylus input 172 and/or device controls 174a-174k, can be used for successive or repeated entry of one or more selectable items, characters, and/or locations.

In alternate embodiments of the selective input system 30, entire keyboard arrangements are readily changed, such as to be suitable for an intended function, or based upon the preference of a user. For example, the design of a QWERTY keyboard set 176, can be changed to a DVORAK keyboard set 176, or a phone directory interface set 176 can be changed to a telephone keypad interface set 176. Similarly, all or part of the input screen area 14 may be used in combination with shorthand or character recognition type entry, e.g. Graffiti®.

FIG. 12 shows a schematic view 180 of an alternate selective input system 30f, based on the tracking of absolute positions of a pointing device 16, wherein the input region 14 is changeable for function and/or appearance. For example, the device 12 is readily adapted to provide a plurality of different functions 182a-182j, through which the selective input system 30e tracks the motion parameters of a pointing device 16, e.g. such as but not limited to a text entry 182a, spell checking 182b, an alternate keyboard 182c, a schedule interface 182d, a to-do list 182e, or other graphic interfaces 182f,182j.

As seen in to-do list interface 182e, a user may readily input desired priorities 186 on a group of tasks 184, such that the tasks 184 are readily rearranged, based on the tracked path 38. As seen in graphic area interface 182f, a user may readily input a desired travel itinerary 188, based on tracked travel path 186 on a map 190. Similarly, a graphic area interface 112j can display a game interface 192, whereby the tracking of motions and/or positions of a pointing device 16 determines game actions decisions and/or outcomes 194, such as success 194a and/or accumulated points 194b.

FIG. 13 is a perspective view 200 of an alternate selective input system 30g based on the tracking of motion 38 of an input device through a region or volume 14. The selective input system 30f and associated method 98 are readily adapted to provide an input system based upon motion of an actual device 12, such as to detect two or three-dimensional motion in a variety of coordinate systems 92, e.g. 92a-92c.

In the exemplary system 30f shown in FIG. 13, a user USR controllably moves an input device 12, such as but not limited to a stylus, PDA, cell phone, laser pointer, light pen, bare hand HD, a glove 204, or finger 12. For example, in a gaming system, a glove can be used for motion tracking. As well, while the exemplary system 30f shown in FIG. 13 shows the possible tracking of a bare hand HD or a gloved hand 204, other portions of the body of a person may be tracked, such as but not limited to a foot, a head, or other appendages. Similarly, while the exemplary system 30f shown in FIG. 13 shows the possible tracking of a glove 204, other accessories, tools, or articles of clothing 204 may alternately be used as a pointing device 12 for motion tracking, such as but not limited to a ring, a bracelet, a hat, a toy, or a wand. For example, the motion of a pointing tip of a play sword or wand 12 can be tracked, which can additionally be displayed on a projection screen 202, such as in context with a game scene.

Upon detection of relative motion and path 38 and/or subsequent positions 34, the enhanced device 12 is readily used for a wide variety of applications, such as but not limited writing, game input, and/or control, either within the device itself 12, or in relation to other devices 202.

In some alternate selective input systems 30g, the enhanced input device comprises accelerometers and/or a detection field for detection of relative motion and path 38 and/or subsequent positions 34. In other alternate selective input systems 30g, emitted light from laser pointer 12 is projected in relation to a projection screen 202, such as to provide a two-dimensional input. In yet another alternate selective input system 30g, emitted light from a light pen is detected on scan lines of a video screen 202, such as to provide an alternate two-dimensional input. In another alternate input system 30g, the motion of a user, e.g. a user's hand or finger, is tracked, such as by but not limited to a camera, radar, or lidar, such that no device needs to be held by the user USR.

In the exemplary system 30g shown in FIG. 13, a user USR can cursively write a note, the motion of which is detected, calculated as an entry, disambiguated as necessary, and stored on the device 12. In a similar embodiment, a user can cursively enter a phone number or quick dial entry on an enhanced phone, receive acoustic feedback, such as a message of the intended number, e.g. "The phone number you entered is 555-555-1234", and have the number dialed automatically. In an alternate embodiment, a user USR can cursively enter a desired cable channel, wherein the motion of which is detected, calculated as an entry, disambiguated as necessary, and sent to an external appliance or controller 202.

In the selective input system 30g, the motion of input device 12 is tracked within the region or volume 14, while the user USR preferably gets visual feedback for the current "location" of the enhanced device 12, relative to the specific region or volume 14, to provide a plurality of different functions 182a-182j (FIG. 12), e.g. such as but not limited to a text entry 182a, spell checking 182b, an alternate keyboard 182c, a schedule interface 182d, a to-do list 182e, or other graphic interfaces 182f,182j.

In some preferred embodiments of the selective input system 30g, the display 202 is separate from the input device 12, such as TV screen 202, e.g. for gaming or channel switching applications, or for a heads-up display 202.

System Advantages. The selective input system 30 and associated method 98 provide significant advantages over existing character input systems, such that a user may quickly and intuitively enter one or more selections 20, even within a small interface area 14. In contrast to systems in which a user must repeatedly and accurately point or tap selections 20, the selective input system 30 and associated method 98 allow a much broader use of a pointing device 16, wherein the device 16 can be used in a variety of planar or non-planar movements to enter one or more selectable items or characters 20.

While the selective input system 30 and associated method 98 can be used in combination with alternate methods of user input, e.g. stylus-based shorthand or handwriting recognition systems, the selective input system 30 and associated method 98 provide an intuitive entry system that can be used in many input environments. For example, the selective input method 48 can similarly be implemented on a planar keyboard, a keypad, or a telephone interface.

Although the selective input system and methods of use are described herein in connection with personal computers, mobile devices, appliances, controls, and other microprocessor-based devices, such as portable digital assistants or network enabled cell phones, the apparatus and techniques can be implemented for a wide variety of electronic devices and systems, or any combination thereof, as desired.

As well, while the selective input system and methods of use are described herein in connection with interaction between a two-dimensional input devices and systems, the character input system and methods of use can readily be implemented for selection within other dimensional systems, such as for one-dimensional slide controls, three-dimensional location or selection, or any combination thereof, as desired.

Accordingly, although the invention has been described in detail with reference to a particular preferred embodiments, persons possessing ordinary skill in the art to which this invention pertains will appreciate that various modifications and enhancements may be made without departing from the spirit and scope of the invention and the claims that follow.

What is claimed is:

1. A process for selectable input based on motion of a pointing device in relation to a region, the process comprising the steps of:
    tracking the motion of the pointing device in relation to the region;
    determining a device path of the pointing device, comprising a plurality of positions and corresponding times, based upon the tracked motion;
    for subsequent positions and corresponding times, comparing to path data;
    detecting positions that meet at least one threshold of a selected position along the determined device path, wherein the determined device path comprises at least two selected positions,
        wherein the threshold of a selected position within the region comprises any of starting the device path, looping the device path, changing direction of the device path, changing velocity of the device path, pausing motion in the device path, and ending the device path,
        wherein the threshold of changing direction comprises any of a curve having an estimated radius that is less than a threshold geometry, a comparison of the device oath direction before and after a curve, a sharp cusp edge in the device path, and a comparison of oath direction before and after a cusp;
    determining which of the detected selected positions along the determined device path correspond to a selectable character; and
    entering each of the detected selected positions that correspond to a selectable character.

2. The process of claim 1, wherein the pointing device comprises any of a stylus, a finger, a hand, a glove, a pen, a mouse, a touchpad, a trackball, a laser pointer, and a light pen.

3. The process of claim 1, wherein the region comprises any of a keypad, a touchscreen, and a touchpad.

4. The process of claim 1, wherein the region comprises a two-dimensional area.

5. The process of claim 4, wherein the region further comprises a secondary input value.

6. The process of claim 5, wherein the secondary input value comprises a stylus pressure value.

7. The process of claim 1, wherein the region comprises a three-dimensional volume.

8. The process of claim 1, wherein the tracked motion is limited to motion of the pointing device on a planar surface of the region.

9. The process of claim 1, wherein the tracked motion of the pointing device comprises any of planar motion and non-planar motion of the pointing device in relation to a surface of the region.

10. The process of claim 1, wherein the region comprises an input region in any of a portable digital assistant, a portable telephone, a mobile telephone, a portable computer, and a portable game device.

11. The process of claim 1, further comprising the step of:
    disambiguating at least one determined position which corresponds to an alternate selection.

12. The process of claim 11, wherein the step of disambiguation comprises the steps of:
    displaying the alternate selection; and
    providing a choice by the user between the determined position and the alternate selection.

13. The process of claim 1, further comprising the step of:
    disambiguating at least one subsequent position based upon a contextual comparison between the subsequent position and stored information.

14. The process of claim 13, wherein the stored information comprises any of language, characters, and words.

15. The process of claim 13, wherein the step of disambiguation comprises the steps of:
    providing a spell check function for one or more selected positions; and
    providing a choice by the user of results of the spell check function.

16. The process of claim 1, further comprising the step of:
    disambiguating at least one subsequent position that does not clearly indicate a selectable character within the region.

17. The process of claim 1, further comprising the step of:
    providing feedback to a user.

18. The process of claim 17, wherein the feedback comprises any of visual feedback and audio feedback.

19. The process of claim 18, wherein the visual feedback comprises any of an ink trail corresponding to the determined device path, a font change, a color change, a reverse video color, an alternate background color, an underline, bold face text, italic text, and a text outline.

20. The process of claim 18, wherein the audio feedback comprises any of a tone indicating system confidence in any of tracking and selection, a sound indicating any of a selection and an entry, and an acoustic message.

21. The process of claim 1, further comprising the steps of:
    determining a distance between a current location of the pointing device and selectable characters within the region;
    determining a selectable character which is closest to the current location of the pointing device; and
    highlighting the determined closest selectable character.

22. The process of claim 21, wherein the highlighting comprises any of a display and a magnification of the determined closest selectable character.

23. The process of claim 1, wherein the selected positions correspond to any of characters, menu selections, and functions.

24. The process of claim 1, further comprising the steps of:
providing a plurality of interfaces comprising a plurality of selected positions within the region; and
switching between the interfaces.

25. The process of claim 24, wherein the step of switching between the interfaces comprises a selection by the pointing device.

26. The process of claim 24, wherein the step of switching between the interfaces comprises a selection by a supplementary control.

27. The process of claim 1, further comprising the steps of:
predicting a default selection; and
providing means for accepting the predicted default selection.

28. The process of claim 27, wherein the predicted default selection comprises a word.

29. The process of claim 27, wherein the accepting means comprises any of a directional input, a button selection, a menu selection, a list selection, and a functional input.

30. A process for selectable input based on motion of a pointing device in relation to a region having a plurality of selectable characters, the process comprising the steps of:
tracking the motion of the pointing device in relation to the region, wherein the tracked motion defines a device path comprising at least two selected positions;
determining which of the selected positions along the device path correspond to at least one of the selectable characters; and
detecting a characteristic motion of the pointing device, the characteristic motion corresponding to at least one of the selected positions along the device path that correspond to at least one of the selectable characters.

31. The process of claim 30, wherein the pointing device comprises any of a stylus, a finger, a hand, a glove, a pen, a mouse, a touchpad, a trackball, a laser pointer, and a light pen.

32. The process of claim 30, wherein the region comprises any of a keypad, a touchpad, and an entry screen.

33. The process of claim 30, wherein the characteristic motion comprises any of starting the device path, looping the device path, changing direction of the device path, changing velocity of the device path, pausing motion in the device path, and ending the device path.

34. The process of claim 33, wherein the characteristic motion of changing direction comprises any of a curve having an estimated radius that is less than a threshold geometry, a comparison of the device path direction before and after a curve, a sharp cusp edge in the device path, and a comparison of path direction before and after a cusp.

35. The process of claim 30, wherein the region comprises a two-dimensional area.

36. The process of claim 35, wherein the region further comprises a secondary input value.

37. The process of claim 36, wherein the secondary input value comprises a stylus pressure value.

38. The process of claim 30, wherein the region comprises a three-dimensional volume.

39. The process of claim 30, wherein the tracked motion is limited to motion of the pointing device on a planar surface of the region.

40. The process of claim 30, wherein the tracked motion of the pointing device comprises any of planar motion and non-planar motion of the pointing device in relation to a surface of the region.

41. The process of claim 30, wherein the region comprises an input area in any of a portable digital assistant, a portable telephone, a mobile telephone, a portable computer, and a portable game device.

42. The process of claim 30, further comprising the step of:
disambiguating at least one determined position which corresponds to an alternate selection.

43. The process of claim 42, wherein the step of disambiguation comprises the steps of:
displaying the alternate selection; and
providing a choice by the user between the determined position and the alternate selection.

44. The process of claim 30, further comprising the step of:
providing feedback to user.

45. The process of claim 44, wherein the feedback comprises any of visual feedback and audio feedback.

46. The process of claim 45, wherein the visual feedback comprises any of an ink trail corresponding to the determined device path, a font change, a color change, a reverse video color, an alternate background color, an underline, bold face text, italic text, and a text outline.

47. The process of claim 45, wherein the audio feedback comprises any of a tone indicating system confidence in any of tracking and selection, a sound indicating any of a selection and an entry, and an acoustic message.

48. The process of claim 30, further comprising the steps of:
determining a distance between a current location of the pointing device and selectable characters within the region;
determining a selectable character which is closest to the current location of the pointing device; and
highlighting the determined closest selectable character.

49. The process of claim 48, wherein the highlighting comprises any of a display and a magnification of the determined closest selectable character.

50. The process of claim 30, further comprising the step of:
disambiguating at least one subsequent position based upon a contextual comparison between the subsequent position and stored information.

51. The process of claim 50, wherein the stored information comprises any of language, characters, and words.

52. The process of claim 50, wherein the step of disambiguation comprises the steps of:
providing a spell check function for one or more selected positions; and
providing a choice by the user of results of the spell check function.

53. The process of claim 30, further comprising the step of:
disambiguating at least one subsequent position that does not clearly indicate a selectable character within the region.

54. The process of claim 30, wherein the selected positions correspond to any of characters, menu selections, and functions.

55. The process of claim 30, further comprising the steps of:
providing a plurality of interfaces comprising a plurality of selected positions within the region; and
switching between the interfaces.

56. The process of claim 55, wherein the step of switching between the interfaces comprises a selection by the input device.

57. The process of claim 55, wherein the step of switching between the interfaces comprises a selection by a supplementary control.

58. The process of claim 30, further comprising the steps of:
predicting a default selection; and
providing means for accepting the predicted default selection.

59. The process of claim 58, wherein the predicted default selection comprises a word.

60. The process of claim 58, wherein the accepting means comprises any of a directional input, a button selection, a menu selection, a list selection, and a functional input.

61. A system for selectable input based on motion of a pointing device in relation to an region, comprising:
means for tracking the motion of the pointing device in relation to the region;
a determined device path, comprising a plurality of positions and corresponding times, based upon the tracked motion;
a comparison of subsequent positions and corresponding times to path data;
means for detecting subsequent positions that meet at least one threshold of a selected position along the determined device path, wherein the determined device path comprises at least two selected positions,
wherein the threshold of a selected position within the region comprises any of starting the device path, looping the device path, changing direction of the device path, changing velocity of the device path, pausing motion in the device path, and ending the device path, and
wherein the threshold of changing direction comprises any of a curve having an estimated radius that is less than a threshold geometry, a comparison of the device oath direction before and after a curve, a sharp cusp edge in the device path, and a comparison of oath direction before and after a cusp;
means for determining which of the detected selected positions along the determined device path correspond to a selectable character; and
means for sequential entry of each of the detected selected positions that correspond to a selectable character.

62. The system of claim 61, wherein the pointing device comprises any of a stylus, a finger, a hand, a glove, a pen, a mouse, a touchpad, a trackball, a laser pointer, and a light pen.

63. The system of claim 61, wherein the region comprises any of a keypad, a touchpad, and an entry screen.

64. The system of claim 61, wherein the region comprises a two-dimensional area.

65. The system of claim 64, wherein the region further comprises a secondary input value.

66. The system of claim 65, wherein the secondary input value comprises a stylus pressure value.

67. The system of claim 61, wherein the region comprises a three-dimensional volume.

68. The system of claim 61, wherein the tracked motion is limited to motion of the pointing device on a planar surface of the region.

69. The system of claim 61, wherein the tracked motion of the pointing device comprises any of planar motion and non-planar motion of the device in relation to a surface of the region.

70. The system of claim 61, wherein the region comprises an input area in any of a portable digital assistant, a portable telephone, a mobile telephone, a portable computer, and a portable game device.

71. The system of claim 61, further comprising:
means for disambiguating at least one determined position which corresponds to an alternate selection.

72. The system of claim 71, wherein the disambiguation means comprises:
a display of the alternate selection; and
a selectable choice by the user between the determined position and the alternate selection.

73. The system of claim 61, further comprising:
means for providing feedback to a user.

74. The system of claim 73, wherein the feedback comprises any of visual feedback and audio feedback.

75. The system of claim 74, wherein the visual feedback comprises any of an ink trail corresponding to the determined device path, a font change, a color change, a reverse video color, an alternate background color, an underline, bold face text, italic text, and a text outline.

76. The system of claim 74, wherein the audio feedback comprises any of a tone indicating system confidence in any of tracking and selection, a sound indicating any of a selection and an entry, and an acoustic message.

77. The system of claim 61, further comprising:
logic for determining a distance between a current location of the pointing device and selectable characters within the region;
logic for determining a selectable character which is closest to the current location of the pointing device; and
a highlight corresponding to the determined closest selectable character.

78. The system of claim 77, wherein the highlight comprises any of a display and a magnification of the determined closest selectable character.

79. The system of claim 61, further comprising:
means for disambiguating at least one subsequent position based upon a contextual comparison between the subsequent position and stored information.

80. The system of claim 79, wherein the stored information comprises any of language, characters, and words.

81. The system of claim 79, wherein the disambiguation means comprises:
a spell check function for one or more selected positions; and
a choice for the user of results of the spell check function.

82. The system of claim 61, further comprising:
a disambiguation of at least one subsequent position that does not clearly indicate a selectable character within the region.

83. The system of claim 61, wherein the selected positions correspond to any of characters, menu selections, and functions.

84. The system of claim 61, further comprising:
a plurality of interfaces comprising a plurality of selected positions within the region; and
means for switching between the interfaces.

85. The system of claim 84, wherein the means for switching between the interfaces comprises a pointing device selection.

86. The system of claim 84, wherein the means for switching between the interfaces comprises a supplementary control.

87. The system of claim 61, further comprising:
logic for predicting a default selection; and
means for accepting the predicted default selection.

88. The system of claim 87, wherein the predicted default selection comprises a word.

89. The system of claim 87, wherein the accepting means comprises any of a directional input, a button selection, a menu selection, a list selection, and a functional input.

90. A system for selectable input based upon motion of a pointing device in relation to a region having a plurality of selectable characters, comprising:
   means for tracking the motion of the pointing device in relation to the region, wherein the tracked motion defines a device path comprising at least two selected positions;
   means for determining which of the selected positions along the device path correspond to at least one of the selectable characters; and
   logic for determining a characteristic motion of the pointing device that corresponds to at least one of the selected positions along the device path corresponding to at least one of the selectable characters.

91. The system of claim 90, wherein the pointing device comprises any of a stylus, a finger, a hand, a glove, a pen, a mouse, a touchpad, a trackball, a laser pointer, and a light pen.

92. The system of claim 90, wherein the region comprises any of a keypad, a touchpad, and an entry screen.

93. The system of claim 90, wherein the characteristic motion comprises any of starting the device path, looping the device path, changing direction of the device path, changing velocity of the device path, pausing motion in the device path, and ending the device path.

94. The system of claim 93, wherein the characteristic motion of changing direction comprises any of a curve having an estimated radius that is less than a threshold geometry, a comparison of the device path direction before and after a curve, a sharp cusp edge in the device path, and a comparison of path direction before and after a cusp.

95. The system of claim 90, wherein the region comprises a two-dimensional area.

96. The system of claim 95, wherein the region further comprises a secondary input value.

97. The system of claim 96, wherein the secondary input value comprises a stylus pressure value.

98. The system of claim 90, wherein the region comprises a three-dimensional volume.

99. The system of claim 90, wherein the tracked motion is limited to motion of the pointing device on a planar surface of the region.

100. The system of claim 90, wherein the tracked motion of the pointing device comprises any of planar motion and non-planar motion of the device in relation to a surface of the region.

101. The system of claim 90, wherein the region comprises an input area in any of a portable digital assistant, a portable telephone, a mobile telephone, a portable computer, and a portable game device.

102. The system of claim 90, further comprising:
   means for disambiguating at least one determined position which corresponds to an alternate selection.

103. The system of claim 102, wherein the disambiguation means comprises:
   a display of the alternate selection; and
   a selectable choice by the user between the determined position and the alternate selection.

104. The system of claim 90, further comprising:
   means for providing feedback to a user.

105. The system of claim 104, wherein the feedback comprises any of visual feedback and audio feedback.

106. The system of claim 105, wherein the visual feedback comprises any of an ink trail corresponding to the tracked motion, a font change, a color change, a reverse video color, an alternate background color, an underline, bold face text, italic text, and a text outline.

107. The system of claim 105, wherein the audio feedback comprises any of a tone indicating system confidence in any of tracking and selection, a sound indicating any of a selection and an entry, and an acoustic message.

108. The system of claim 90, further comprising:
   logic for determining a distance between a current location of the pointing device and selectable characters within the region;
   logic for determining a selectable character which is closest to the current location of the pointing device; and
   a highlight corresponding to the determined closest selectable character.

109. The system of claim 108, wherein the highlight comprises any of a display and a magnification of the determined closest selectable character.

110. The system of claim 90, further comprising:
   means for disambiguating at least one subsequent position based upon a contextual comparison between the subsequent position and stored information.

111. The system of claim 110, wherein the stored information comprises any of languages, characters, and words.

112. The system of claim 110, wherein the disambiguation means comprises:
   a spell check function for one or more selected positions; and
   a choice for the user of results of the spell check function.

113. The system of claim 90, further comprising:
   a disambiguation of at least one subsequent position that does not clearly indicate a selectable character within the region.

114. The system of claim 113, wherein the disambiguating comprises:
   a display of at least one selectable character that may correspond to the subsequent position that does not clearly indicate a selectable character within the region; and
   a selectable choice for the user of the at least one selectable character.

115. The system of claim 90, wherein the selected positions correspond to any of characters, menu selections, and functions.

116. The system of claim 90, further comprising:
   a plurality of interfaces comprising a plurality of selected positions within the region; and
   means for switching between the interfaces.

117. The system of claim 90, wherein the means for switching between the interfaces comprises a pointing device selection.

118. The system of claim 90, wherein the means for switching between the interfaces comprises a supplementary control.

119. The system of claim 90, further comprising:
   logic for predicting a default selection; and
   means for accepting the predicted default selection.

120. The system of claim 119, wherein the predicted default selection comprises a word.

121. The system of claim 119, wherein the accepting means comprises any of a directional input, a button selection, a menu selection, a list selection, and a functional input.

122. A process for selectable input based on motion of a pointing device in relation to a region, the process comprising the steps of:
   tracking the motion of the pointing device in relation to the region;

determining a device path of the pointing device, comprising a plurality of positions and corresponding times, based upon the tracked motion;
for subsequent positions and corresponding times, comparing to path data;
detecting subsequent positions which meet at least one threshold of a selected position within the region, wherein the threshold of a selected position within the region comprises any of starting the device path, changing direction of the device path, changing velocity of the device path, pausing motion in the device path, and ending the device path; and
entering each of the selected positions which correspond to a selection;
wherein the threshold of changing direction comprises any of a curve having an estimated radius that is less than a threshold geometry, a comparison of the device path direction before and after a curve, a sharp cusp edge in the device path, and a comparison of path direction before and after a cusp.

123. A process for selectable input based on motion of a pointing device in relation to a region, the process comprising the steps of:
tracking the motion of the pointing device in relation to the region;
determining a device path of the pointing device, comprising a plurality of positions and corresponding times, based upon the tracked motion;
for subsequent positions and corresponding times, comparing to path data;
detecting subsequent positions which meet at least one threshold of a selected position within the region;
entering each of the selected positions which correspond to a selection; and
disambiguating at least one subsequent position which does not clearly indicate a selected position within the region.

124. The process of claim 123, wherein the step of disambiguating comprises the steps of:
displaying at least one selectable position which may correspond to the subsequent position that does not clearly indicate a selected position within the region; and
providing a choice by the user of the at least one selectable position.

125. A process for selectable input based on motion of a pointing device in relation to a region, the process comprising the steps of:
tracking the motion of the pointing device in relation to the region;
determining a device path of the pointing device, comprising a plurality of positions and corresponding times, based upon the tracked motion;
for subsequent positions and corresponding times, comparing to path data;
detecting subsequent positions which meet at least one threshold of a selected position within the region;
entering each of the selected positions which correspond to a selection;
determining a distance between a current location of the pointing device and selectable positions within the region;
determining a selectable position which is closest to the current location of the pointing device; and
highlighting the determined closest selectable position.

126. The process of claim 125, wherein the highlighting comprises any of a display and a magnification of the determined closest selectable position.

127. A process for selectable input based on motion of a pointing device in relation to a region, the process comprising the steps of:
tracking the motion of the pointing device in relation to the region; and
detecting a characteristic motion of the pointing device, the characteristic motion corresponding to at least one selectable input, wherein the characteristic motion comprises any of starting the device path, changing direction of the device path, changing velocity of the device path, pausing motion in the device path, and ending the device path;
wherein the characteristic motion of changing direction comprises any of a curve having an estimated radius that is less than a threshold geometry, a comparison of the device path direction before and after a curve, a sharp cusp edge in the device path, and a comparison of path direction before and after a cusp.

128. A process for selectable input based on motion of a pointing device in relation to a region, the process comprising the steps of:
tracking the motion of the pointing device in relation to the region;
detecting a characteristic motion of the pointing device, the characteristic motion corresponding to at least one selectable input;
determining a distance between a current location of the pointing device and selectable positions within the region;
determining a selectable position which is closest to the current location of the pointing device; and
highlighting the determined closest selectable position.

129. The process of claim 128, wherein the highlighting comprises any of a display and a magnification of the determined closest selectable position.

130. A system for selectable input based on motion of a pointing device in relation to an region, comprising:
means for tracking the motion of the pointing device in relation to the region;
a determined device path, comprising a plurality of positions and corresponding times, based upon the tracked motion;
a comparison of subsequent positions and corresponding times to path data;
means for detecting subsequent positions which meet at least one threshold of a selected position within the region, wherein the at least one threshold of a selected position within the region comprises any of starting the device path, changing direction of the device path, changing velocity of the device path, pausing motion in the device path, and ending the device path; and
means for sequential entry of each of the selected positions which correspond to a selection;
wherein the threshold of changing direction comprises any of a curve having an estimated radius that is less than a threshold geometry, a comparison of the device path direction before and after a curve, a sharp cusp edge in the device path, and a comparison of path direction before and after a cusp.

131. A system for selectable input based on motion of a pointing device in relation to an region, comprising:
means for tracking the motion of the pointing device in relation to the region;
a determined device path, comprising a plurality of positions and corresponding times, based upon the tracked motion;

a comparison of subsequent positions and corresponding times to path data;

means for detecting subsequent positions which meet at least one threshold of a selected position within the region;

means for sequential entry of each of the selected positions which correspond to a selection; and a disambiguation of at least one subsequent position which does not clearly indicate a selected position within the region.

132. The system of claim 131, wherein the disambiguation comprises:

a display of at least one selectable position which may correspond to the subsequent position that does not clearly indicate a selected position within the region; and a selectable choice for the user of the at least one selectable position.

133. A system for selectable input based on motion of a pointing device in relation to an region, comprising:

means for tracking the motion of the pointing device in relation to the region;

a determined device path, comprising a plurality of positions and corresponding times, based upon the tracked motion;

a comparison of subsequent positions and corresponding times to path data;

means for detecting subsequent positions which meet at least one threshold of a selected position within the region;

means for sequential entry of each of the selected positions which correspond to a selection;

logic for determining a distance between a current location of the pointing device and selectable positions within the region;

logic for determining a selectable position which is closest to the current location of the pointing device; and a highlight corresponding to the determined closest selectable position.

134. The system of claim 133, wherein the highlight comprises any of a display and a magnification of the determined closest selectable position.

135. A system for selectable input based upon motion of a pointing device in relation to an region, comprising:

means for tracking the motion of the pointing device in relation to the region; and logic for determining a characteristic motion of the pointing device which corresponds to at least one selectable input, wherein the characteristic motion comprises any of starting the device path, changing direction of the device path, changing velocity of the device path, pausing motion in the device path, and ending the device path;

wherein the characteristic motion of changing direction comprises any of a curve having an estimated radius that is less than a threshold geometry, a comparison of the device path direction before and after a curve, a sharp cusp edge in the device path, and a comparison of path direction before and after a cusp.

136. A system for selectable input based upon motion of a pointing device in relation to an region, comprising:

means for tracking the motion of the pointing device in relation to the region;

logic for determining a characteristic motion of the pointing device which corresponds to at least one selectable input;

logic for determining a distance between a current location of the pointing device and selectable positions within the region;

logic for determining a selectable position which is closest to the current location of the pointing device; and a highlight corresponding to the determined closest selectable position.

137. The system of claim 136, wherein the highlight comprises any of a display and a magnification of the determined closest selectable position.

138. A process for selectable input based on motion of a pointing device in relation to a region, the process comprising the steps of:

tracking the motion of the pointing device in relation to the region;

determining a device path of the pointing device, comprising a plurality of positions and corresponding times, based upon the tracked motion;

for subsequent positions and corresponding times, comparing to path data;

detecting positions that meet at least one threshold of a selected position along the determined device path corresponding to a selectable character within the region, wherein the determined device path comprises at least two selected positions;

entering each of the detected selected positions that correspond to a selectable character; and disambiguating at least one subsequent position that does not clearly indicate a selectable character within the region.

139. The process of claim 138, wherein the step of disambiguating comprises the steps of:

displaying at least one selectable character that may correspond to the subsequent position that does not clearly indicate a selectable character within the region; and providing a choice by the user of the at least one selectable character.

140. A process for selectable input based on motion of a pointing device in relation to a region having a plurality of selectable characters, the process comprising the steps of:

tracking the motion of the pointing device in relation to the region, wherein the tracked motion defines a device path comprising at least two selected positions;

detecting a characteristic motion of the pointing device, the characteristic motion corresponding to at least one of the selected positions along the device path that correspond to at least one of the selectable characters; and disambiguating at least one subsequent position that does not clearly indicate a selectable character within the region.

141. The process of claim 140, wherein the disambiguating step comprises the steps of:

displaying at least one selectable character that may correspond to the subsequent position that does not clearly indicate a selectable character within the region; and providing a choice by the user of the at least one selectable character.

142. A system for selectable input based on motion of a pointing device in relation to an region, comprising:

means for tracking the motion of the pointing device in relation to the region;

a determined device path, comprising a plurality of positions and corresponding times, based upon the tracked motion;

a comparison of subsequent positions and corresponding times to path data;

means for detecting subsequent positions that meet at least one threshold of a selected position along the determined device path corresponding to a selectable character within the region, wherein the determined device path comprises at least two selected positions;

means for sequential entry of each of the detected selected positions that correspond to a selectable character; and a disambiguation of at least one subsequent position that does not clearly indicate a selectable character within the region.

143. The system of claim 142, wherein the disambiguation comprises:

a display of at least one selectable character that may correspond to the subsequent position that does not clearly indicate a selectable character within the region; and a selectable choice for the user of the at least one selectable character.

* * * * *